US008133581B2

(12) United States Patent
Kato et al.

(10) Patent No.: US 8,133,581 B2
(45) Date of Patent: Mar. 13, 2012

(54) ELECTROCONDUCTIVE POLYMER COMPOSITION, ELECTROCONDUCTIVE POLYMER MATERIAL AND METHOD FOR PRODUCING ELECTROCONDUCTIVE POLYMER MATERIAL

(75) Inventors: Takashi Kato, Kanagawa (JP); Katsuyuki Yofu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 420 days.

(21) Appl. No.: 12/465,662

(22) Filed: May 14, 2009

(65) Prior Publication Data

US 2010/0136329 A1 Jun. 3, 2010

(30) Foreign Application Priority Data

May 20, 2008 (JP) ................................ 2008-132035

(51) Int. Cl.
*B32B 27/06* (2006.01)
*B32B 27/36* (2006.01)

(52) U.S. Cl. ........ 428/336; 252/500; 252/609; 428/335; 428/704

(58) Field of Classification Search .................. 252/500, 252/609; 428/335, 336, 704
See application file for complete search history.

(56) References Cited

U.S. PATENT DOCUMENTS

2003/0224169 A1* 12/2003 Kobayashi et al. ........... 428/408

FOREIGN PATENT DOCUMENTS

EP 440957 B1 3/1996
JP 2006-505099 T 2/2006

* cited by examiner

*Primary Examiner* — Terressa Boykin
(74) *Attorney, Agent, or Firm* — SOLARIS Intellectual Property Group, PLLC

(57) ABSTRACT

An electroconductive polymer composition of the invention contains a conductive polymer and a trivalent phosphorus compound. The trivalent phosphorus compound is preferably a compound represented by the following Formulae (I) to (IV). In Formulae (I) to (IV), $R^1$ to $R^{12}$ each independently represent a hydrogen atom, an alkyl group, an aryl group or a heteroaryl group. An electroconductive polymer material of the invention has a layer formed by using the conductive polymer composition, or has a layer containing a conductive polymer and a layer containing a trivalent phosphorus compound separately.

Formula (I)

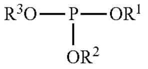

Formula (II)

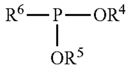

Formula (III)

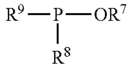

Formula (IV)

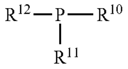

14 Claims, 2 Drawing Sheets

ELECTROCONDUCTIVE POLYMER COMPOSITION, ELECTROCONDUCTIVE POLYMER MATERIAL AND METHOD FOR PRODUCING ELECTROCONDUCTIVE POLYMER MATERIAL

CROSS REFERENCE TO RELATED APPLICATIONS

This application claims priority under 35 USC 119 from Japanese Patent Application No. 2008-132035, the disclosure of which is incorporated herein by reference.

BACKGROUND OF THE INVENTION

1. Field of the Invention

The present invention relates to an electroconductive polymer composition, an electroconductive polymer material and a method for producing the electroconductive polymer material.

2. Description of the Related Art

In recent years, an image display unit (display) typified by liquid crystal display (LCD), plasma display panel (PDP) and electroluminescence (EL) devices or the like has been widely used in various fields such as television sets, computer and various types of mobile instruments which have recently been spreading increasingly, and are undergoing remarkable development. On the other hand, solar batteries are attracting attention as one of non-fossil energies which pay consideration to global environment. In order to address the need for further spread of solar batteries, research for improving the functions thereof and the like has been demanded. An electroconductive film has been used for such display element and solar battery.

Generally, electroconductive films using a metallic material, such as ITO-based electroconductive films, are produced by forming, on a glass substrate, a film from a metallic material by a vapor phase methods such as a vacuum deposition method or a sputtering method. Display devices such as portable telephone and mobile instruments have been becoming lighter in weight, and it has been demanded that display device substrate is shifted from glass to plastic. The introduction of a plastic substrate has reduced the weight of display devices to become a half or less in comparison to the convectional products, and a plastic substrate has been remarkably improved in strength and impact resistance.

There, however, is a problem with regard to ITO-based electroconductive films in that the substitution of glass substrate with plastic films results in a decrease in adhesiveness, and making a substrate and a formed electroconductive film prone to easily peel off each other. Moreover, metallic materials, such as ITO, are ordinarily formed into a film by using a vapor phase method such as sputtering, so that an expensive production apparatus needs to be used.

An electroconductive polymer is known as a conductive material instead of metallic materials such as ITO. The use of an electroconductive polymer allows a conductive thin film to be formed by coating and offers the advantage that a conductive thin film may be inexpensively produced. Moreover, an electrode made of an electroconductive polymer is more flexible and less brittle than ITO electrodes, and it therefore is less prone to break even though it is used for flexible items. Thus, it also has an advantage that the application of an electrode made of an electroconductive polymer to a touch screen requiring a particularly high flexible electrode allows the life span of the device to be prolonged.

As such an electroconductive polymer, polythiophene containing polyanion has been developed, and a technique for forming an electroconductive film by using this polymer is disclosed in the specification of European Patent No. 440957. It, however, has become clear that this electroconductive film is slightly weaker in durability than ITO films and the like and that it may not achieve a durability sufficient for practical use in some applications.

In particular, when the electroconductive film is applied to display devices, photo-durability, that is, that transparency and conductivity are not decreased even after being irradiated with light to some extent or more, is very important.

For such a problem, an electroconductive film such in which polyphosphoric acid and a specific phenolic compound are added to polythiophene has been proposed in Japanese Patent Application National Publication (Laid-Open) No. 2006-505099. According to this document, the addition of polyphosphoric acid or the like makes photo-durability improve, namely, the increase of surface is inhibited upon exposure to light.

SUMMARY OF THE INVENTION

A first aspect according to the present invention is an electroconductive polymer composition comprising an electroconductive polymer and a trivalent phosphorus compound.

A second aspect according to the present invention is an electroconductive polymer material comprising:

a support; and a layer formed by using the electroconductive polymer composition according to the first aspect on or above the support.

A third aspect according to the present invention is an electroconductive polymer material comprising:

a support;

at least one layer containing an electroconductive polymer; and at least one layer containing a trivalent phosphorus compound, and the layers being disposed on or above the support.

A fourth aspect according to the present invention is a method of producing the electroconductive polymer material according to the third aspect, a method comprising forming at least two layers among the layer(s) containing an electroconductive polymer and the layer(s) containing a trivalent phosphorus compound by simultaneous multilayer coating.

DETAILED DESCRIPTION OF THE INVENTION

Figure 1:
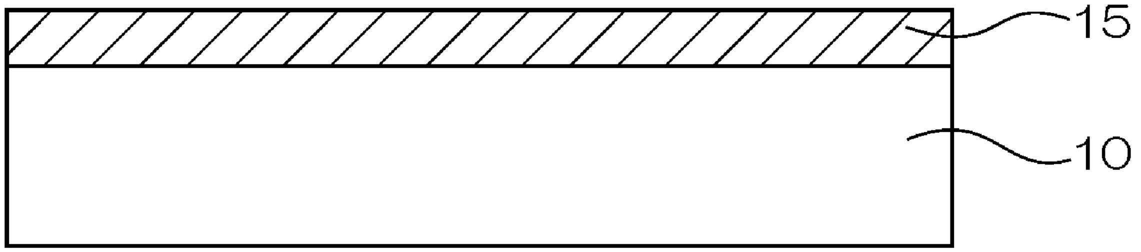
FIG. 1 is a cross-sectional schematic view showing an example of a layer composition of an electroconductive polymer material of a first exemplary embodiment.

It became obvious that, according to a technology of Japanese Patent Application National Publication (Laid-Open) No. 2006-505099, while the photo-durability is certainly improved, when an electroconductive polymer such as polythiophene and polyphosphoric acid are mixed, the electroconductive polymer aggregates in some cases and thereby it is difficult to obtain a uniform film. It has been found that this aggregation also leads to a decrease in transparency of the electroconductive film and also to an increase in surface resistivity of the film immediately after the formation thereof.

Through earnest studies in view of the above-mentioned circumstances, the present inventors have obtained the findings that a composition, in which a trivalent phosphorus compound is added to an electroconductive polymer, does not cause the aggregation of the electroconductive polymer, consequently, allow an electroconductive film excellent in transparency and electro-conductivity to be formed, and that the electroconductive film is excellent in photo-durability. After more research based on the findings, the present invention was accomplished.

Furthermore, they have obtained the findings that photo-durability is improved even though a trivalent phosphorus compound is added to a different layer from a layer containing the electroconductive polymer. After more research based on the findings, the present invention was accomplished.

In the present invention, 'photo-durability' means that the fluctuation of transmittance and surface resistance value after being irradiated with outdoor light or a light source such as a xenon lamp for a certain time is small.

The present invention may provide an electroconductive polymer composition capable of forming an electroconductive film excellent in photo-durability, transparency and conductivity without causing the aggregation of an electroconductive polymer, an electroconductive polymer material excellent in photo-durability, transparency and conductivity, and a method of producing the electroconductive polymer material.

Hereinafter, the present invention will be described in detail. The denotation "to" in this specification means the numerals before and after "to", both inclusive as the minimum value and the maximum value, respectively.

<Electro-Conductive Polymer Composition>

An electroconductive polymer composition of the present invention contains at least (1) an electroconductive polymer and (2) a trivalent phosphorus compound.

(1) Electro-Conductive Polymer

The electroconductive polymer to be used for the present invention refers to a polymer which exhibits an electrical conductivity of $10^{-6}$ S·cm$^{-1}$ or more. Any polymer corresponding to the above may be used. More preferred is a polymer having an electrical conductivity of $10^{-1}$ S·cm$^{-1}$ or more.

The electroconductive polymer is preferably a non-conjugated polymer or conjugated polymer made up of aromatic carbon rings or aromatic heterocycles linked by single bonds or divalent or multivalent linking groups.

The aromatic carbon rings in the non-conjugated polymer or conjugated polymer is, for example, a benzene ring and also may be formed a fused ring.

The aromatic heterocycle in the non-conjugated polymer or conjugated polymer is, for example, a pyridine ring, a pyrazine ring, a pyrimidine ring, a pyridazine ring, a triazine ring, an oxazole ring, a thiazole ring, an imidazole ring, an oxadiazole ring, a thiadiazole ring, a triazole ring, a tetrazole ring, a furan ring, a thiophene ring, a pyrrole ring, an indole ring, a carbazole ring, a benzimidazole ring, an imidazopyridine ring, or the like. It also may be formed a fused ring and may have a substituent.

Examples of the divalent or multivalent linking group in a non-conjugated polymer or conjugated polymer include linking groups formed by a carbon atom, a silicon atom, a nitrogen atom, a boron atom, an oxygen atom, a sulfur atom, metal, metal ion, or the like. Preferred are a carbon atom, a nitrogen atom, a silicon atom, a boron atom, an oxygen atom, a sulfur atom, and a group formed of a combination thereof. Examples of such a group formed of a combination include a methylene group, a carbonyl group, an imino group, a sulfonyl group, a sulfinyl group, an ester group, an amide group and a silyl group, which are either substituted or unsubstituted.

Specific examples of the electroconductive polymer include polyaniline, poly(para-phenylene), poly(para-phenylenevinylene), polythiophene, polyfuran, polypyrrole, polyselenophene, polyisothianaphthene, polyphenylene sulfide, polyacethylene, polypyridylvinylene and polyazine, which are electroconductive and are either substituted or non-substituted. These may be used either singly or, according to the purpose, in combination of two or more kinds thereof.

If a desired electrical conductivity is achieved, it may be used in the form of a mixture with another polymer having no electrical conductivity, and copolymers of such monomers with other monomers having no electrical conductivity may also be used.

The electroconductive polymer is preferably a conjugated polymer. Examples of such a conjugated polymer include polyacethylene, polydiacetylene, poly(para-phenylene), polyfluorene, polyazulene, poly(paraphenylene sulfide), polypyrrole, polythiophene, polyisothianaphthene, polyaniline, poly(para-phenylenevinylene), poly(2,5-thienylenevinylene), multiple chain type conjugated polymers (polyperinaphthalene, an the like), metal phthalocyanine-type polymers, and other conjugated polymers [poly(para-xylylene), poly[α-(5,5'-bithiophenediyl)benzylidene], and the like.

Preferred are poly(para-phenylene), polypyrrole, polythiophene, polyaniline, poly(para-phenylenevinylene) and poly(2,5-thienylenevinylene). More preferred are poly(para-phenylene), polythiophene and poly(para-phenylenevinylene).

Such conjugated polymers may have a substituent, examples of the substituent include substituents which are described as $R^{11}$ in Formula (I) given below.

In the present invention, it is preferable, from the viewpoint of compatibility of high transparency and high electrical conductivity, particularly that the electroconductive polymers have a partial structure represented by the following Formula (I) (in other words, that it be polythiophene or its derivative).

Formula (1)

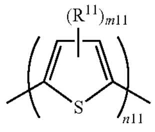

In Formula (1), $R^{11}$ represents a substituent; and m11 is an integer of from 0 to 2. When m11 represents 2, the $R^{11}$s may be either the same or different and also may be linked each other to form a ring. $n^{11}$ is an integer of 1 or greater.

The substituent represented by $R^{11}$ includes alkyl groups (preferably having 1 to 20 carbon atoms, more preferably having 1 to 12 carbon atoms, and still more preferably having 1 to 8 carbon atoms; for example, methyl, ethyl, isopropyl, tert-butyl, n-octyl, n-decyl, n-hexadecyl, cyclopropyl, cyclopentyl and, cyclohexyl), alkenyl groups (preferably having 2 to 20 carbon atoms, more preferably having 2 to 12 carbon atoms, and still more preferably having 2 to 8 carbon atoms; for example, vinyl, allyl, 2-butenyl, 3-pentenyl, 2-hexenyl, 3-hexenyl, 4-hexenyl and 2-octenyl), alkynyl groups (preferably having 2 to 20 carbon atoms, more preferably having 2 to 12 carbon atoms, and still more preferably having 2 to 8 carbon atoms; for example, propargyl and 3-pentynyl), aryl groups (preferably having 6 to 30 carbon atoms, more preferably having 6 to 20 carbon atoms, and still more preferably having 6 to 12 carbon atoms; for example, phenyl, p-methylphenyl and naphthyl), amino group (preferably having 0 to 20 carbon atoms, more preferably having 0 to 10 carbon atoms, and still more preferably having 0 to 6 carbon atoms; for example, amino, methylamino, dimethylamino, diethylamino, dibenzylamino, and diphenylamino), alkoxy groups (preferably having 1 to 20 carbon atoms, more preferably having 1 to 12 carbon atoms, and still more preferably having 1 to 8 carbon atoms; for example, methoxy, ethoxy, butoxy, hexyloxy and octyloxy), aryloxy groups (preferably having 6 to 20 carbon atoms, more preferably having 6 to 16 carbon atoms, and still more preferably having 6 to 12 carbon atoms; for example, phenyloxy and 2-naphthyloxy), acyl groups (preferably having 1 to 20 carbon atoms, more preferably having 1 to 16 carbon atoms, and still more preferably having 1 to 12 carbon atoms; for example, acetyl, benzoyl, formyl and pivaloyl), alkoxycarbonyl groups (preferably having 2 to 20 carbon atoms, more preferably having 2 to 16 carbon atoms, and still more preferably having 2 to 12 carbon atoms; for example, methoxycarbonyl and ethoxycarbonyl), aryloxycarbonyl groups (preferably having 7 to 20 carbon atoms, more preferably having 7 to 16 carbon atoms, and still more preferably having 7 to 10 carbon atoms; for example, phenyloxycarbonyl), acyloxy group (preferably having 2 to 20 carbon atoms, more preferably having 2 to 16 carbon atoms, and still more preferably having 2 to 10 carbon atoms; for example, acetoxy and benzoyloxy), acylamino groups (preferably having 2 to 20 carbon atoms, more preferably having 2 to 16 carbon atoms, and still more preferably having 2 to 10 carbon atoms; for example, acetylamino and benzoylamino), alkoxycarbonylamino groups (preferably having 2 to 20 carbon atoms, more preferably having 2 to 16 carbon atoms, and still more preferably having 2 to 12 carbon atoms; for example, methoxycarbonylamino), aryloxycarbonylamino groups (preferably having 7 to 20 carbon atoms, more preferably having 7 to 16 carbon atoms, and still more preferably having 7 to 12 carbon atoms; for example, phenyloxycarbonylamino), sulfonylamino groups (preferably having 1 to 20 carbon atoms, more preferably having 1 to 16 carbon atoms, and still more preferably having 1 to 12 carbon atoms; for example, methanesulfonylamino and benzenesulfonylamino), a sulfamoyl group (preferably having 0 to 20 carbon atoms, more preferably having 0 to 16 carbon atoms, and still more preferably having 0 to 12 carbon atoms; for example, sulfamoyl, methylsulfamoyl, dimethylsulfamoyl and phenylsulfamoyl), carbamoyl groups (preferably having 1 to 20 carbon atoms, more preferably having 1 to 16 carbon atoms, and still more preferably having 1 to 12 carbon atoms; for example, carbamoyl, methylcarbamoyl, diethylcarbamoyl and phenylcarbamoyl), alkylthio groups (preferably having 1 to 20 carbon atoms, more preferably having 1 to 16 carbon atoms, and still more preferably having 1 to 12 carbon atoms; for example, methylthio and ethylthio), arylthio groups (preferably having 6 to 20 carbon atoms, more preferably having 6 to 16 carbon atoms, and still more preferably having 6 to 12 carbon atoms; for example, phenylthio), sulfonyl groups (preferably having 1 to 20 carbon atoms, more preferably having 1 to 16 carbon atoms, and still more preferably having 1 to 12 carbon atoms; for example, mesyl and tosyl), sulfinyl groups (preferably having 1 to 20 carbon atoms, more preferably having 1 to 16 carbon atoms, and still more preferably having 1 to 12 carbon atoms; for example, methanesulfinyl and benzenesulfinyl), ureido groups (preferably having 1 to 20 carbon atoms, more preferably having 1 to 16 carbon atoms, and still more preferably having 1 to 12 carbon atoms; for example, ureido, methylureido and phenylureido), phosphoamide groups (preferably having 1 to 20 carbon atoms, more preferably having 1 to 16 carbon atoms, and still more preferably having 1 to 12 carbon atoms; for example, diethyl phosphoamide and phenyl phosphoamide), a hydroxy group, a mercapto group, halogen atoms (for example, fluorine atom, chlorine atom, bromine atom and iodine atom), a cyano group, a sulfo group, a carboxyl group, a nitro group, a hydroxamic acid group, a sulfino group, a hydrazino group, an imino group, heterocyclic groups (preferably having 1 to 20 carbon atoms and more preferably having 1 to 12 carbon atoms; examples of hetero atoms include a nitrogen atom, an oxygen atom and a sulfur atom; specific examples include pyrrolidine, piperidine, piperazine, morpholine, thiophene, furan, pyrrole, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylydine, quinoxaline, quinazoline, cinnoline, pteridine, acridine, phenanthroline, phenazine, tetrazole, benzimidazole, benzoxazole, benzthiazole, benzotriazole and tetraazaindene), and silyl groups (preferably having 3 to 40 carbon atoms, more preferably having 3 to 30 carbon atoms, and still more preferably having 3 to 24 carbon atoms; for example, trimethylsilyl and triphenylsilyl).

The substituent represented by $R^{11}$ may be additionally substituted. When it has a plural substituents, they may be either the same or different and may, if possible, be linked together to form a ring. Examples of the ring to be formed include a cycloalkyl ring, a benzene ring, a thiophene ring, a dioxane ring and a dithiane ring.

The substituent represented by $R^{11}$ is preferably an alkyl group, an alkenyl group, an alkynyl group, an alkoxy group and an alkylthio group, and more preferably an alkyl group, an alkoxy group and an alkylthio group. In still more preferably, when m11 is 2, two $R^{11}$s are alkoxy groups or alkylthio groups forming a ring, and it is preferable to form a dioxane ring or a dithiane ring.

When m11 is 1 in Formula (1), $R^{11}$ is preferably an alkyl group, and more preferably an alkyl group having 2 to 8 carbon atoms.

When Formula (1) is poly(3-alkylthiophene) that $R^{11}$ is an alkyl group, the linkage mode between the adjacent thiophene rings includes a sterically regular mode in which all thiophene rings are linked by 2-5' and a sterically irregular mode which contains 2-2' linkages and 5-5' linkages. Among them, the sterically irregular mode is preferred.

In the present invention, it is particularly preferable, from the viewpoint of achieving both high transparency and high electrical conductivity, that the electroconductive polymer is 3,4-ethylenedioxy-polythiophene, which is specific example compound (6) shown below.

The polythiophene represented by Formula (1) and derivatives thereof may be prepared by known methods such as those disclosed in J. Mater. Chem., 15, 2077-2088 (2005) and Advanced Materials, 12(7), 481 (2000). For examples, Denatron P502 (manufactured by NAGASE CHEMICAL CO., LTD.), 3,4-ethylenedioxythiophene (BAYTRON (registered trademark) M V2), and 3,4-polyethylenedioxythiopene/polystyrenesulfonate (BAYTRON (registered trademark) P), BAYTRON (registered trademark) C), BAYTRON (registered trademark) F E, BAYTRON (registered trademark) M V2, BAYTRON (registered trademark) P, BAYTRON (registered trademark) P AG, BAYTRON (registered trademark) P HC V4, BAYTRON (registered trademark) P HS, BAYTRON (registered trademark) PH, BAYTRON (registered trademark) PH 500 and BAYTRON (registered trademark) PH 510 (all the BAYTRONs are manufactured by H.C. Starck GmbH) may be obtained as commercial products.

A polyaniline (manufactured by Aldrich Chemical Company, Inc.), a polyaniline (ereraldine (phonetic) base) (manufactured by Aldrich Chemical Company, Inc.), or the like are available as polyaniline or derivatives thereof.

A polypyrrole (manufactured by Aldrich Chemical Company, Inc.) or the like are available as polypyrrole or derivatives thereof.

Specific examples of an electroconductive polymer are shown below, but the present invention is not limited to them. Besides these, compounds disclosed in W098/01909 and so on are also provided as examples.

(1)

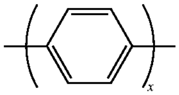

(2)

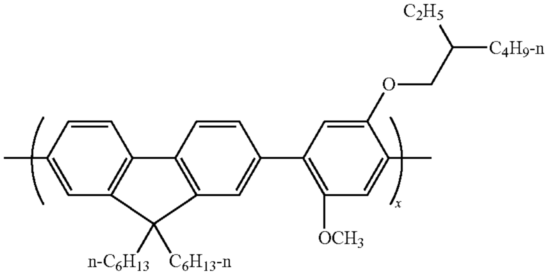

(3)

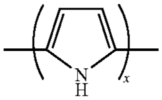

(4)

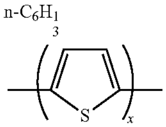

(5)

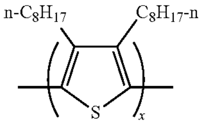

(6)

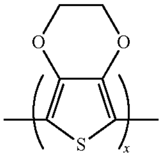

(7)

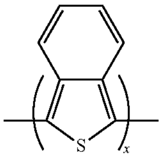

-continued (8)

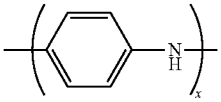

(9)

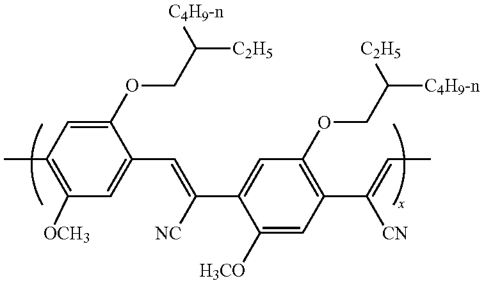

(10)

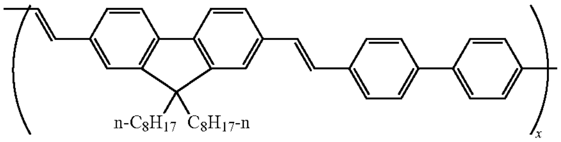

(11)

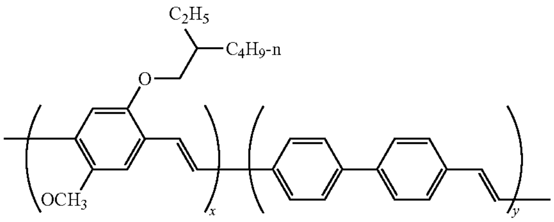

(12)

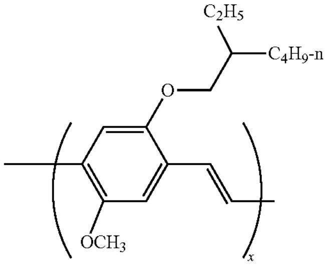

(13)

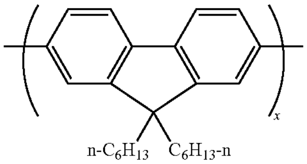

(14)

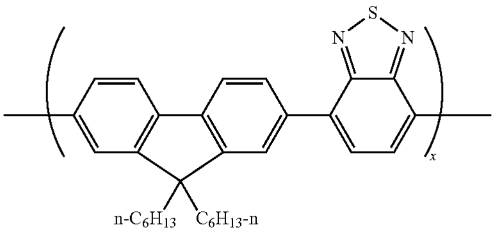

-continued (15)

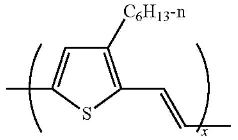

(16)

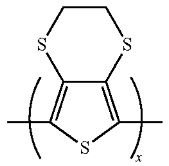

(17)

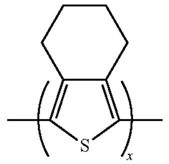

(18)

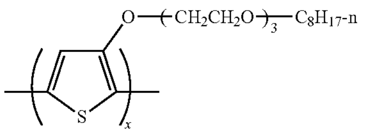

The weight average molecular weight of an electroconductive polymer to be used in the present invention is preferably from 1,000 to 1,000,000, more preferably from 10,000 to 500,000, and still more preferably from 10,000 to 100,000.

(2) Trivalent Phosphorus Compound

An electroconductive polymer composition of the present invention contains a trivalent phosphorus compound. A trivalent phosphorus compound does not cause the aggregation even in coexisting with the above-mentioned electroconductive polymer. Therefore, a film formed by using an electroconductive polymer composition of the present invention, containing a trivalent phosphorus compound and the electroconductive polymer, exhibits high transparency and conductivity and additionally is excellent in photo-durability.

The case of adding polyphosphoric acid causes the electroconductive polymer to aggregate, while a trivalent phosphorus compound does not cause the aggregation. It is surmised that the reason therefore is that the pH of an electroconductive polymer composition does not change even though a trivalent phosphorus compound is added. However, the present invention is not limited to such a surmise.

The above-mentioned trivalent phosphorus compound is preferably a compound represented by following Formulae (I), (II), (III) or (IV).

Formula (I)

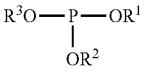

Formula (II)

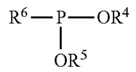

Formula (III)

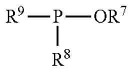

-continued

Formula (IV)

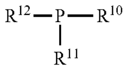

In Formulae (I), (II), (III) and (IV), $R^1$, $R^2$, $R^3$, $R^4$, $R^5$, $R^6$, $R^7$, $R^8$, $R^9$, $R^{10}$, $R^{11}$ and $R^{12}$ each independently represent a hydrogen atom, an alkyl group, an aryl group or a heteroaryl group; an alkyl group, an aryl group or a heteroaryl group are preferable from the viewpoint of allowing high photo-durability; and an alkyl group is more preferable from the viewpoint of solubility.

An alkyl group, an aryl group and a heteroaryl group represented by $R^1$, $R^2$, $R^3$, $R^4$, $R^5$, $R^6$, $R^7$, $R^8$, $R^9$, $R^{10}$, $R^{11}$ and $R^{12}$ may each have a substituent. Examples of a substituent include a substituent group V described below.

(Substituent Group V)

Halogen atom (for example, chlorine, bromine, iodine, fluorine); a mercapto group; a cyano group; a carboxyl group; a phosphoric acid group; a sulfo group; a hydroxy group; carbamoyl groups having 1 to 10 carbon atoms, preferably having 2 to 8 carbon atoms, and more preferably having 2 to 5 carbon atoms (for example, a methylcarbamoyl group, an ethylcarbamoyl group and a morpholinocarbamoyl group); sulfamoyl groups having 0 to 10 carbon atoms, preferably having 2 to 8 carbon atoms, and more preferably having 2 to 5 carbon atoms (for example, a methylsulfamoyl group, an ethylsulfamoyl group and a piperidinosulfamoyl group); a nitro group; alkoxy groups having 1 to 20 carbon atoms, preferably having 1 to 10 carbon atoms, and more preferably having 1 to 8 carbon atoms (for example, a methoxy group, an ethoxy group, a 2-methoxyethoxy group and a 2-phenylethoxy group); aryloxy groups having 6 to 20 carbon atoms, preferably having 6 to 12 carbon atoms, and more preferably having 6 to 10 carbon atoms (for example, a phenoxy group, a p-methylphenoxy group, a p-chlorophenoxy group and a naphthoxy group); acyl groups having 1 to 20 carbon atoms, preferably having 2 to 12 carbon atoms, and more preferably having 2 to 8 carbon atoms (for example, an acetyl group, a benzoyl and a trichloroacetyl group); acyloxy groups having 1 to 20 carbon atoms, preferably having 2 to 12 carbon atoms, and more preferably having 2 to 8 carbon atoms (for example, an acetyloxy group and a benzoyloxy group); acylamino groups having 1 to 20 carbon atoms, preferably having 2 to 12 carbon atoms, and more preferably having 2 to 8 carbon atoms (for example, an acetylamino group);

sulfonyl groups having 1 to 20 carbon atoms, preferably having 1 to 10 carbon atoms, and more preferably having 1 to 8 carbon atoms (for example, a methanesulfonyl group, an ethanesulfonyl group and a benzenesulfonyl group); sulfinyl groups having 1 to 20 carbon atoms, preferably having 1 to 10 carbon atoms, and more preferably having 1 to 8 carbon atoms (for example, a methanesulfinyl group, an ethanesulfinyl group and a benzenesulfinyl group); sulfonylamino groups having 1 to 20 carbon atoms, preferably having 1 to 10 carbon atoms, and more preferably having 1 to 8 carbon atoms (for example, a methanesulfonylamino group, an ethanesulfonylamino group and a benzenesulfonylamino group); substituted or unsubstituted amino groups having 0 to 20 carbon atoms, preferably having 0 to 12 carbon atoms, and more preferably having 0 to 8 carbon atoms (for example, an unsubstituted amino group, a methylamino group, a dimethylamino, a benzylamino group, an anilino group and a diphenylamino group); ammonium groups having 0 to 15 carbon atoms, preferably having 3 to 10 carbon atoms, and more preferably having 3 to 6 carbon atoms (for example, a trimethylammonium group and a triethylammonium group); hydrazino groups having 0 to 15 carbon atoms, preferably having 1 to 10 carbon atoms, and more preferably having 1 to 6 carbon atoms (for example, a trimethylhydrazino group); ureido groups having 1 to 15 carbon atoms, preferably having 1 to 10 carbon atoms, and more preferably having 1 to 6 carbon atoms (for example, an ureido group and an N,N-dimethylureido group); imide groups having 1 to 15 carbon atoms, preferably having 1 to 10 carbon atoms, and more preferably having 1 to 6 carbon atoms (for example, a succinimide group);

alkylthio groups having 1 to 20 carbon atoms, preferably having 1 to 12 carbon atoms, and more preferably having 1 to 8 carbon atoms (for example, a methylthio group, an ethylthio group and a propylthio group); arylthio groups having 6 to 80 carbon atoms, preferably having 6 to 40 carbon atoms, and more preferably having 6 to 30 carbon atoms (for example, a phenylthio group, a p-methylphenylthio group, a p-chlorophenylthio group, a 2-pyridylthio group, a 1-naphthylthio group, a 2-naphthylthio group, a 4-propylcyclohexyl-4'-biphenylthio group, a 4-butylcyclohexyl-4'-biphenylthio group, a 4-pentylcyclohexyl-4'-biphenylthio group and a 4-propylphenyl-2-ethynyl-4'-biphenylthio group); heteroarylthio groups having 1 to 80 carbon atoms, preferably having 1 to 40 carbon atoms, and more preferably having 1 to 30 carbon atoms (for example, a 2-pyridylthio group, a 3-pyridylthio group, a 4-pyridylthio group, a 2-quinolylthio group, 2-furilthio group and a 2-pyrrolylthio group); alkoxycarbonyl groups having 2 to 20 carbon atoms, preferably having 2 to 12 carbon atoms, and more preferably having 2 to 8 carbon atoms (for example, a methoxycarbonyl group, an ethoxycarbonyl group and a 2-benzyloxycarbonyl group), aryloxycarbonyl groups having 6 to 20 carbon atoms, preferably having 6 to 12 carbon atoms, and more preferably having 6 to 10 carbon atoms (for example, a phenoxycarbonyl group);

unsubstituted alkyl groups having 1 to 18 carbon atoms, preferably having 1 to 10 carbon atoms, and more preferably having 1 to 5 carbon atoms (for example, a methyl group, an ethyl group, a propyl group and a butyl group); substituted alkyl groups having 1 to 18 carbon atoms, preferably having 1 to 10 carbon atoms, and more preferably having 1 to 5 carbon atoms (for example, a hydroxymethyl, a trifluoromethyl group, a benzyl group, a carboxyethyl group, an ethoxycarbonylmethyl group and an acetylaminomethyl group, wherein unsaturated hydrocarbon groups having 2 to 18 carbon atoms, preferably having 3 to 10 carbon atoms, and more preferably having 3 to 5 carbon atoms (for example, a vinyl group, an ethynyl group, a 1-cyclohexenyl group, a benzylidyne group and a benzylidene group) shall be included in the substituted alkyl groups); substituted or unsubstituted aryl groups having 6 to 20 carbon atoms, preferably having 6 to 15 carbon atoms, and more preferably having 6 to 10 carbon atoms (for example, a phenyl group, a naphthyl group, a p-carboxyphenyl group, a p-nitrophenyl group, a 3,5-dichlorophenyl group, a p-cyanophenyl group, a m-fluorophenyl group, a p-tolyl group, 4-propylcyclohexyl-4'-biphenyl, 4-butylcyclohexyl-4'-biphenyl, 4-pentylcyclohexyl-4'-biphenyl and 4-propylphenyl-2-ethynyl-4'-biphenyl); and substituted or unsubstituted heterocyclic groups having 1 to 20 carbon atoms, preferably having 2 to 10 carbon atoms, and more preferably having 4 to 6 carbon atoms (for example, a pyridyl group, a 5-methylpyridyl group, a thienyl group, a furil group, a morpholino group and a tetrahydrofurfuryl group) are included.

Substituents of the substituent group V may form a structure in which a benzene ring or a naphthalene ring is fused. Furthermore, such substituents may be additionally substituted. Such an additional substituent may be any one selected from the substituent group V.

An alkyl group represented by $R^1$, $R^2$, $R^3$, $R^4$, $R^5$, $R^6$, $R^7$, $R^8$, $R^9$, $R^{10}$, $R^{11}$ or $R^{12}$ is preferably a substituted or unsubstituted alkyl group having 1 to 6 carbon atoms, more preferably 1 to 50 carbon atoms, and still more preferably 1 to 40 carbon atoms.

An alkyl group represented by $R^1$, $R^2$, $R^3$, $R^4$, $R^5$, $R^6$, $R^7$, $R^8$, $R^9$, $R^{10}$, $R^{11}$ or $R^{12}$ may be any of straight-chain, branched-chain or cyclic; straight-chain or branched-chain alkyl groups are preferable from the viewpoint of costs and solubility.

A substituent of an alkyl group represented by $R^1$, $R^2$, $R^3$, $R^4$, $R^5$, $R^6$, $R^7$, $R^8$, $R^9$, $R^{10}$, $R^{11}$ or $R^{12}$ is preferably an alkyl group, an aryl group, an alkoxy group, a halogen atom, a hydroxy group, a substituted or unsubstituted amino group, a carboxyl group, a phosphoric acid group or a sulfo group among the above-mentioned substituent group V, more preferably an alkyl group, an alkoxy group, a hydroxy group, a substituted amino group, a carboxyl group, a phosphoric acid group or a sulfo group, and still more preferably a hydroxy group, a substituted amino group, a phosphoric acid group and a sulfo group.

Specific examples of an alkyl group represented by $R^1$, $R^2$, $R^3$, $R^4$, $R^5$, $R^6$, $R^7$, $R^8$, $R^9$, $R^{10}$, $R^{11}$ or $R^{12}$ include methyl, ethyl, propyl, butyl, pentyl, octyl, 2-ethylhexyl, cyclohexyl, hexadecyl, 3-dodecyloxypropyl and 3-(2',4'-di-tert-pentylphenoxy)propyl.

An aryl group represented by $R^1$, $R^2$, $R^3$, $R^4$, $R^5$, $R^6$, $R^7$, $R^8$, $R^9$, $R^{10}$, $R^{11}$ or $R^{12}$ is preferably a substituted or unsubstituted aryl group having 6 to 6 carbon atoms, more preferably 6 to 50 carbon atoms, and still more preferably 6 to 40 carbon atoms.

A substituent of an aryl group represented by $R^1$, $R^2$, $R^3$, $R^4$, $R^5$, $R^6$, $R^7$, $R^8$, $R^9$, $R^{10}$, $R^{11}$ or $R^{12}$ is preferably an alkyl group, an aryl group, an alkoxy group, a halogen atom, a hydroxy group, a substituted or unsubstituted amino group, a carboxyl group, a phosphoric acid group and a sulfo group among the above-mentioned substituent group V, more preferably an alkyl group, an alkoxy group, a hydroxy group, a substituted amino group, a carboxyl group, a phosphoric acid group and a sulfo group, and still more preferably a hydroxy group, a substituted amino group, a phosphoric acid group and a sulfo group.

In the case where an aryl group represented by $R^1$, $R^2$, $R^3$, $R^4$, $R^5$, $R^6$, $R^7$, $R^8$, $R^9$, $R^{10}$, $R^{11}$ or $R^{12}$ is a phenyl group, the substitution site of the above-mentioned substituent on the phenyl group is not particularly limited. In the case where a number of the substituent of the phenyl group is one, the phenyl group preferably has the substituent at 4-position from the viewpoint of allowing high photo-durability, and in the case where a number of the substituents of the phenyl group is two, the phenyl group preferably has the substituent at 2,6-position and 3,5-position.

Specific examples of an aryl group represented by $R^1$, $R^2$, $R^3$, $R^4$, $R^5$, $R^6$, $R^7$, $R^8$, $R^9$, $R^{10}$, $R^{11}$ or $R^{12}$ include phenyl, 1-naphtyl, p-tolyl, o-tolyl, 4-methoxyphenyl, 4-hexadecyloxyphenyl, 3-pentadecylphenyl, 2,4-di-tert-pentylphenyl, 8-quinolyl and 5-(1-dodecyloxycarbonylethoxycarbonyl)-2-chlorophenyl.

A heteroaryl group represented by $R^1$, $R^2$, $R^3$, $R^4$, $R^5$, $R^6$, $R^7$, $R^8$, $R^9$, $R^{10}$, $R^{11}$ or $R^{12}$ is preferably a five-membered to eight-membered heteroaryl group including at least one hetero atom of N, S, O and Se.

Specific examples thereof include 4-pyridyl, 2-furyl, 2-pyrrole, 2-thiazolyl, 3-thiazolyl, 2-oxazolyl, 2-imidazolyl, triazolyl, tetrazolyl, benzotriazolyl, 2-quinolyl and 3-quinolyl.

$R^1$, $R^2$, $R^3$, $R^4$, $R^5$, $R^6$, $R^7$, $R^8$, $R^9$, $R^{10}$, $R^{11}$ or $R^{12}$ may be linked to each other to form a ring.

The trivalent phosphorus compound used for the present invention is preferably a compound represented by Formula (I) from the viewpoint of solubility.

$R^1$, $R^2$ and $R^3$ in Formula (I) may be the same or different, and preferably the same from the viewpoint of costs and availability.

$R^1$, $R^2$ and $R^3$ in Formula (I) are preferably an alkyl group from the viewpoint of solubility, more preferably an alkyl group with no substituents from the viewpoint of costs.

The trivalent phosphorus compound used for the present invention may be a salt compound. Examples of a functional group for forming such a salt include an ammonium group and a sulfonium group. Examples of a counter ion include an anionic counter ion (such as $Cl^-$, $Br^-$, $I^-$, $ClO_4^-$, $PF_6^-$, $AsF_6^-$, $SbF_6^-$, $BF_4^-$, and various kinds of sulfonate anions) against an ammonium group, and a cationic counter ion (such as $Na^+$, $K^+$ and $Mg^{2+}$) against a sulfonium group.

Specific examples of the trivalent phosphorus compound used for the present invention are shown hereinafter, and the trivalent phosphorus compound is not limited to these specific examples.

| | $P\text{—}(OR)_3$ |
|---|---|
| A-1 | R = $CH_3$ |
| A-2 | R = $C_2H_5$ |
| A-3 | R = n-$C_3H_7$ |
| A-4 | R = n-$C_4H_9$ |
| A-5 | R = t-$C_4H_9$ |
| A-6 | R = n-$C_5H_{11}$ |
| A-7 | R = n-$C_7H_{14}COOH$ |
| A-8 | R = $(CH_2)_2Cl$ |
| A-9 | R = n-$C_{11}H_{22}OH$ |
| A-10 | 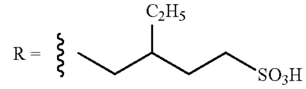 |
| A-11 | 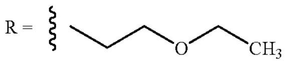 |
| A-12 | 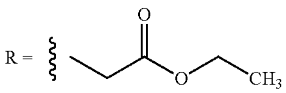 |
| A-13 | 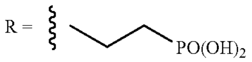 |
| A-14 | 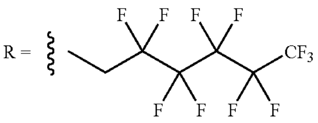 |

represents a bonding site

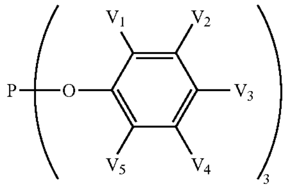

| | V1 | V2 | V3 | V4 | V5 |
|---|---|---|---|---|---|
| A-15 | H | H | H | H | H |
| A-16 | H | H | $CH_3$ | H | H |
| A-17 | H | H | n-$C_9H_{19}$ | H | H |
| A-18 | H | H | $OCH_3$ | H | H |
| A-19 | H | Cl | Cl | H | H |
| A-20 | $CH_3$ | H | H | H | $CH_3$ |
| A-21 | $CH_3$ | H | $CH_3$ | H | $CH_3$ |
| A-22 | H | H | Ph | H | H |
| A-23 | H | OH | OH | OH | H |
| A-24 | H | H | $NH_2$ | H | H |
| A-25 | H | H | COOH | H | H |
| A-26 | H | H | $SO_3H$ | H | H |
| A-27 | H | H | $PO(OH)_2$ | H | H |
| A-28 | $CH_3$ | $CH_3$ | $CH_3$ | $CH_3$ | $CH_3$ |

A-29

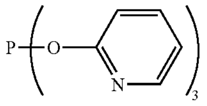

A-30

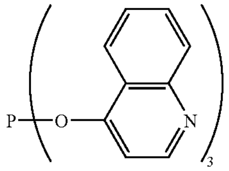

A-31

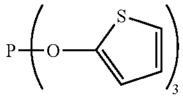

| | $R^1O\text{—}P\text{—}(OR^2)_2$ |
|---|---|
| A-32 | $R^1 = CH_3$, $R^2 = C_2H_5$ |
| A-33 | $R^1$ = Ph, $R^2 = C_2H_5$ |
| A-34 | $R^1$ = n-$C_{13}H_{27}$, $R^2 = C_2H_5$ |
| A-35 | 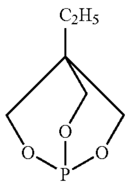 |

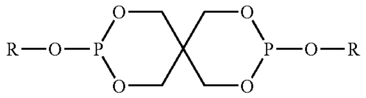

| | |
|---|---|
| A-36 | R = n-$C_{18}H_{37}$ |
| A-37 | R = n-$C_{10}H_{21}$ |

| |
|---|
| 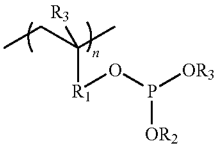 n = 1~10,000 |

| | |
|---|---|
| A-38 | $R_1 = (CH_2)_4$, $R_2 = CH_3$, $R_3 = CH_3$ |
| A-39 | $R_1 = (CH_2)_4$, $R_2 = C_6H_5$, $R_3 = C_6H_5$ |
| A-40 | 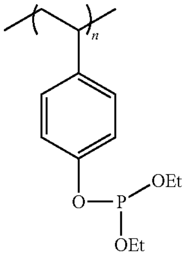 n = 1~10,000 |

| P—(OR)$_3$ | |
|---|---|
| A-41 | $R = n\text{-}C_7H_{14}N^+Et_3Cl^-$ |
| A-42 | R = 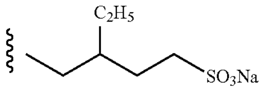 |
| A-43 | 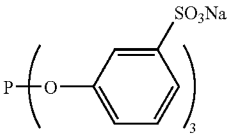 |

| P—(R)$_3$ | |
|---|---|
| B-1 | $R = CH_3$ |
| B-2 | $R = C_2H_5$ |
| B-3 | $R = n\text{-}C_3H_7$ |
| B-4 | $R = n\text{-}C_4H_9$ |
| B-5 | $R = t\text{-}C_4H_9$ |
| B-6 | $R = n\text{-}C_5H_{11}$ |
| B-7 | $R = n\text{-}C_7H_{14}COOH$ |
| B-8 | $R = n\text{-}C_9H_{19}$ |
| B-9 | $R = n\text{-}C_{11}H_{22}OH$ |
| B-10 | R = 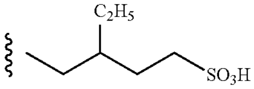 |
| B-11 | R = 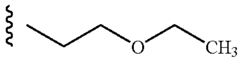 |
| B-12 | R = 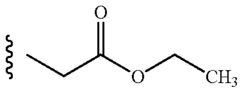 |

-continued

| P—(R)$_3$ | |
|---|---|
| B-13 | R = 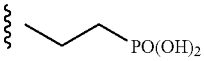 |
| B-14 | R = 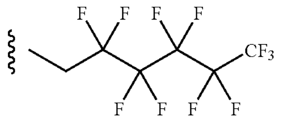 |

represents a bonding site

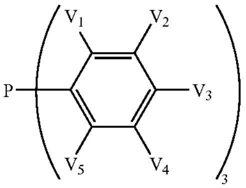

| | V1 | V2 | V3 | V4 | V5 |
|---|---|---|---|---|---|
| B-15 | H | H | H | H | H |
| B-16 | H | H | $CH_3$ | H | H |
| B-17 | H | H | $n\text{-}C_9H_{19}$ | H | H |
| B-18 | H | H | $OCH_3$ | H | H |
| B-19 | H | Cl | Cl | H | H |
| B-20 | $CH_3$ | H | H | H | $CH_3$ |
| B-21 | $CH_3$ | H | $CH_3$ | H | $CH_3$ |
| B-22 | H | H | Ph | H | H |
| B-23 | H | OH | OH | OH | H |
| B-24 | H | H | $NH_2$ | H | H |
| B-25 | H | H | COOH | H | H |
| B-26 | H | H | $SO_3H$ | H | H |
| B-27 | H | H | $PO(OH)_2$ | H | H |
| B-28 | $CH_3$ | $CH_3$ | $CH_3$ | $CH_3$ | $CH_3$ |
| B-29 | 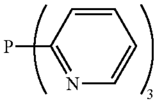 | | | | |
| B-30 | 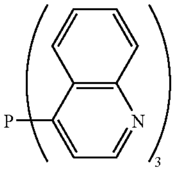 | | | | |
| B-31 | 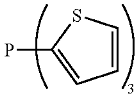 | | | | |

| $R^1$—P—($R^2$)$_2$ | |
|---|---|
| B-32 | $R^1 = CH_3$, $R^2 = C_2H_5$ |
| B-33 | $R^1 = Ph$, $R^2 = C_2H_5$ |
| B-34 | $R^1 = n\text{-}C_{13}H_{27}$, $R^2 = C_2H_5$ |

-continued

| | $R^1$—P—($R^2$)$_2$ |
|---|---|
| B-35 | 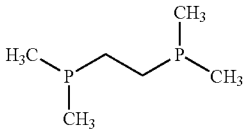 |
| B-36 | 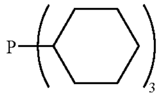 |
| B-37 | 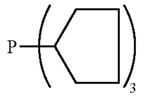 |

| | 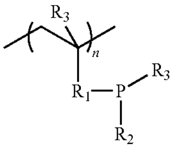 n = 1~10,000 |
|---|---|
| B-38 | $R_1 = (CH_2)_4$, $R_2 = CH_3$, $R_3 = CH_3$ |
| B-39 | $R_1 = (CH_2)_4$, $R_2 = C_6H_5$, $R_3 = C_6H_5$ |
| B-40 | 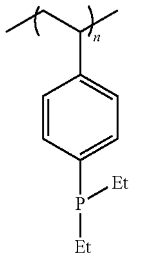 n = 1~10,000 |

| | P—(R)$_3$ |
|---|---|
| B-41 | R = n-$C_7H_{14}N^+Et_3Cl^-$ |
| B-42 | R = 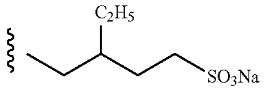 |
| B-43 | 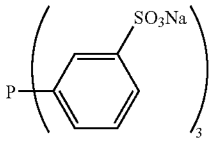 |

| | $R^1$O—P—($R^2$)$_2$ |
|---|---|
| C-1 | $R^1 = CH_3$, $R^2 = CH_3$ |
| C-2 | $R^1 = C_2H_5$, $R^2 = C_2H_5$ |
| C-3 | $R^1 = C_5H_{11}$, $R^2 = C_4H_9$ |
| C-4 | $R^1 = C_2H_4OH$, $R^2 = C_2H_5$ |
| C-5 | $R^1 = C_2H_4SO_3H$, $R^2 = Ph$ |
| C-6 | $R^1 = Ph$, $R^2 = Ph$ |
| C-7 | $R^1 = Ph$, $R^2 = C_6H_4$-4-OH |
| C-8 | $R^1 = Ph$, $R^2 = C_6H_4$-4-PO(OH)$_2$ |

| | $R^1$—P—($OR^2$)$_2$ |
|---|---|
| D-1 | $R^1 = CH_3$, $R^2 = CH_3$ |
| D-2 | $R^1 = C_2H_5$, $R^2 = C_2H_5$ |
| D-3 | $R^1 = C_5H_{11}$, $R^2 = C_4H_9$ |
| D-4 | $R^1 = C_2H_4OH$, $R^2 = C_2H_5$ |
| D-5 | $R^1 = C_2H_4SO_3H$, $R^2 = Ph$ |
| D-6 | $R^1 = Ph$, $R^2 = Ph$ |
| D-7 | $R^1 = Ph$, $R^2 = C_6H_4$-4-OH |
| D-8 | $R^1 = Ph$, $R^2 = C_6H_4$-4-PO(OH)$_2$ |

The trivalent phosphorus compound may be synthesized by a known method. Specifically, methods described in Organic Phosphorus Compounds edited by G. M. Kosolapoff L. Maier, John Wiley & Sons Inc., 1973 and in Japanese Patent Application Laid-Open (JP-A) No. 2004-256456 are preferably used.

Some trivalent phosphorus compounds are commercially available; examples thereof include Phosphorus Acid Tris(2-chloroethyl) Ester (manufactured by Tokyo Chemical Industry Co., Ltd.), Tris(2-ethylhexyl) Phosphite (manufactured by Tokyo Chemical Industry Co., Ltd.), Trihexyl Phosphite (manufactured by Tokyo Chemical Industry Co., Ltd.), Triisodecyl Phosphite (manufactured by Tokyo Chemical Industry Co., Ltd.), Trimethyl Phosphite (manufactured by Tokyo Chemical Industry Co., Ltd.), Tri-n-octadecyl Phosphite (manufactured by Tokyo Chemical Industry Co., Ltd.), Trimethylolpropane Phosphite (manufactured by Tokyo Chemical Industry Co., Ltd.), 1,2-Bis(dimethylphosphino)ethane (manufactured by Tokyo Chemical Industry Co., Ltd.), Tributylphosphine (manufactured by Tokyo Chemical Industry Co., Ltd.), Tri-n-octylphosphine (manufactured by Tokyo Chemical Industry Co., Ltd.), Trihexylphosphine (manufactured by Tokyo Chemical Industry Co., Ltd.), Tricyclohexylphosphine (manufactured by Tokyo Chemical Industry Co., Ltd.) and Tris(2-carboxyethyl)phosphine Hydrochloride (manufactured by Tokyo Chemical Industry Co., Ltd.).

The compounding ratio of the trivalent phosphorus compound and the electroconductive polymer according to the present invention may be any one; preferably a range of trivalent phosphorus compound:electroconductive polymer=0.00001:1 to 1000:1 at mass ratio, preferably a range of 0.0001:1 to 500:1, more preferably a range of 0.0005:1 to 100:1, still more preferably a range of 0.001:1 to 50:1, and still more preferably a range of 0.01:1 to 10:1 from the viewpoint of compatibility between high conductivity and high durability.

A method for adding the trivalent phosphorus compound of the present invention may be any one. A method for mixing up dispersion containing the electroconductive polymer and solution in which the trivalent phosphorus compound is dissolved is preferable. The detail thereof is described later.

(The Other Additives)

—Dopant—

From the viewpoint that the dispersibility of the electroconductive polymer in a solvent is improved, it is preferable that the electroconductive polymer composition contain at least one dopant. The electroconductive polymer layer is suitably formed by coating as described below. To obtain a dispersion liquid (composition) with favorable dispersibility is important from the viewpoint of production. The dopant as used herein means an additive which has an action of changing the electrical conductivity of an electroconductive polymer. Such dopants include electron-accepting (i.e., acceptor) dopants and electron-donating (i.e., donor) dopants.

Examples of electron-accepting (i.e., acceptor) dopants include halogens ($Cl_2$, $Br_2$, $I_2$, ICl, $ICl_3$, IBr, IF), Lewis acids ($PF_5$, $AsF_5$, $SbF_5$, $BF_3$, $BCl_3$, $BBr_3$, $SO_3$), proton acids (HF, HCl, $HNO_3$, $H_2SO_4$, $HClO_4$, $FSO_3H$, $ClSO_3H$, $CF_3SO_3H$, various organic acids, amino acids, and the like), transition metal compounds ($FeCl_3$, FeOCl, $TiCl_4$, $ZrCl_4$, $HfCl_4$, $NbF_5$, $NbCl_5$, $TaCl_5$, $MoF_5$, $MoCl_5$, $WF_6$, $WCl_6$, $UF_6$, $LnCl_3$ (Ln is lanthanide, such as La, Ce, Pr, Nd, and Sm), electrolyte anions ($Cl^-$, $Br^-$, $I^-$, $ClO_4^-$, $PF_6^-$, $AsF_6^-$, $SbF_6^-$, $BF_4^-$, various sulfonate anions), $O_2$, $XeOF_4$ $(NO_2^+)(SbF_6^-)$, $(NO_2^+)(SbCl_6^-)$, $(NO_2^+)(BF_4^-)$, $FSO_2OOSO_2F$, $AgClO_4$, $H_2IrCl_6$ and $La(NO_3)_3.6H_2O$.

Examples of electron-donating (i.e., donor) dopants include alkali metals (Li, Na, K, Rb, Cs), alkaline earth metals (Ca, Sr, Ba), lanthanides (Eu, or the like), and others ($R_4N^+$, $R_4P^-$, $R_4As^+$, $R_3S^+$, acetylcholine).

Examples of the combination of the dopant and the electroconductive polymer include:

(A) polyacethylene with $I_2$, $AsF_5$, $FeCl_3$ or the like;

(B) poly(p-phenylene) with $AsF_5$, K, $AsF_6^-$ or the like;

(C) polypyrrole with $ClO_4^-$ or the like;

(D) polythiophene with $ClO_4^-$, or a sulfonic acid compound, especially polystyrene sulfonic acid, a nitrosonium salt, an aminium salt, a quinone, or the like;

(E) polyisothianaphthene with $I_2$ or the like;

(F) poly(p-phenylene sulfide) with $AsF_5$;

(G) poly(p-phenyleneoxide) with $AsF_5$;

(H) polyaniline with HCl or the like;

(I) poly(p-phenylenevinylene) with $H_2SO_4$ or the like;

(J) polythiophenylenevinylene with $I_2$ or the like;

(K) nickel phthalocyanine with $I_2$.

Among these combinations, preferred is the combination (D) or (H), more preferred, from the viewpoint that the dope condition is high in stability, is the combination of polythiophenes (polythiophene or its derivative) with a sulfone compound, and still more preferred, from the viewpoint that the aqueous dispersion liquid may be prepared whereby an electroconductive thin film may be prepared easily by coating, is the combination of a polythiophene with a polystyrene sulfonic acid.

The ratio of the electroconductive polymer to the dopant may be any value. From the viewpoint of well achieving both the stability of the dope condition and the electrical conductivity, the weight ratio of the electroconductive polymer to the dopant (electroconductive polymer:the dopant) is preferably within a range of from 1.0:0.0000001 to 1.0:10, more preferably within a range of from 1.0:0.00001 to 1.0:1.0, and still more preferably within a range of 1.0:0.0001 to 1.0:0.5.

In the case where dopant is added to the electroconductive polymer, the electroconductive polymer and the dopant occasionally form a composite. For example, poly(3,4-ethylenedioxy)thiophene (PEDOT) is used as the electroconductive polymer, to which polystyrene sulfonic acid (PSS) is added as the dopant to form a composite with the following structure.

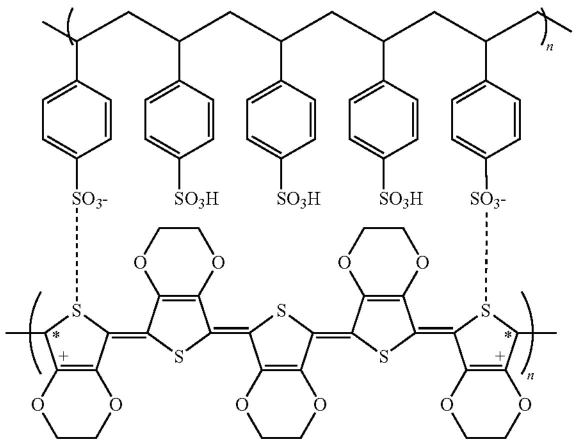

The compounding ratio of the trivalent phosphorus compound and the above-mentioned composite according to the present invention may be any one, and the mass ratio of the composite to the trivalent phosphorus compound (composite: trivalent phosphorus compound) is preferably within a range of from 1.0:0.0000001 to 1.0:1000, preferably a range of 1.0:0.00001 to 1.0:100, more preferably a range of from 1.0:0.0001 to 1.0:50, still more preferably a range of from 1.0:0.005 to 1.0:10, and still more preferably a range of from 1.0:0.001 to 1.0:5.0 from the viewpoint of compatibility between high conductivity and high durability.

In order to improve the dispersibility of an electroconductive polymer, an ion-conductive polymer in which polymer chain has been doped with an electrolyte may be used. Examples of such a polymer chain include polyethers (polyethylene oxide, polypropylene oxide, and the like), polyesters (polyethylene succinate, poly-β-propiolactone, and the like), polyamines (polyethyleneimine, and the like), and polysulfides (polyalkylene sulfide, and the like). The electrolyte doped may be various alkali metal salts.

Examples of the alkali metal ion which constitutes the alkali metal salt include $Li^+$, $Na^+$, $K^+$, $Rb^+$ and $Cs^+$. Examples of the anion which forms the counter salt include $F^-$, $Cl^-$, $Br^-$, $I^-$, $NO_3^-$, $SCN^-$, $ClO_4^-$, $CF_3SO_3^-$, $BF_4^-$, $AsF_6^-$ and $BPh_4^-$.

Examples of the combination of the polymer chain and the alkali metal salt include polyethylene oxide with $LiCF_3SO_3$, $LiClO_4$ or the like, polyethylene succinate with $LiClO_4$, $LiBF_4$, poly-β-propiolactone with $LiClO_4$ or the like, polyethyleneimine with $NaCF_3SO_3$, $LiBF_4$ or the like, and polyalkylene sulfide with $AgNO_3$ or the like.

—The Other Additives—

It is also possible to additionally add a solvent, described below, and other additives to the electroconductive polymer composition of the present invention. The available additives include UV absorbers, inorganic fine particles and polymer particles for the purpose of increasing the film strength, silane coupling agents, and fluorine-containing compounds (especially, fluorine-containing surfactants) for the purpose of reducing a refractive index and increasing transparency simultaneously.

A diol compound is preferably added to a electroconductive polymer composition of the present invention from the viewpoint of decreasing electric resistance value. A diol compound signifies a compound containing two or more hydroxy groups in a molecule; examples thereof include ethylene glycol, glycerin, propylene glycol, diethylene glycol, triethylene glycol, sugar (such as fructose), hydroquinone, gallic acid and catechol, preferably ethylene glycol.

The added amount of the above-mentioned diol compound in an electroconductive polymer composition of the present invention is preferably 0.01 to 99% by mass, more preferably 0.1 to 98% by mass and still more preferably 1 to 90% by mass.

The compounding ratio of the electroconductive polymer and the diol compound (electroconductive polymer:diol compound) may be any one, preferably within a range of from 1:1000 to 1000:1 by mass ratio, more preferably a range of from 1:100 to 100:1, and still more preferably a range of from 1:10 to 10:1 from the viewpoint of compatibility between costs and conductivity.

<Electro-Conductive Polymer Material>

—First Exemplary Embodiment of Electro-Conductive Polymer Material—

An electroconductive polymer material of a first exemplary embodiment of the present invention is provided a support; and a layer formed by using the above-mentioned electroconductive polymer composition (occasionally referred to as 'an electroconductive polymer layer' hereinafter) on or above the support. In addition, a protective layer and/or an interlayer may be provided.

FIG. 1 shows an example of a specific layer composition of an electroconductive polymer material of the first exemplary embodiment. An electroconductive polymer material in FIG. 1 is composed of an electroconductive polymer layer 15 containing an electroconductive polymer and a trivalent phosphorus compound formed on a support 10. In addition, as not shown in FIG. 1, the electroconductive polymer material may be provided with a protective layer, the after-mentioned easily adhesive layer and a layer containing a diol compound.

(1) Support

Any material which is in the form of a stable panel and which satisfies required flexibility, strength, durability may be used as the support 10 capable of being used in the present invention. In the event that the resulting electroconductive polymer material is used in an image display device, a solar cell, or the like, a high transparency is required and therefore the use of a transparent substrate with a smooth surface is preferred as a support.

In the present invention, examples of the material of the support 10 include glass, transparent ceramics, metal and plastic film. Glass and transparent ceramics are inferior in plasticity to metal and plastic film. Plastic film is less expensive than metal and has plasticity. Therefore, plastic film is preferred as the support of the present invention. Examples thereof include films using resin such as cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal and polyarylate. In particular, polyester-based resins (hereinafter, suitably referred to as "polyesters") are preferred. As the polyesters, preferred are linear saturated polyesters which are synthesized from an aromatic dibasic acid or its ester-forming derivative with a diol or its ester-forming derivative.

Specific examples of the polyesters which may be used for the present invention include polyethylene terephthalate, polyethylene isophthalate, polyethylene naphthalate, polybutylene terephthalate, poly(1,4-cyclohexylenedimethylene terephthalate) and polyethylene 2,6-phthalene dicarboxylate. Among these, polyethylene terephthalate, polyethylene naphthalate are preferred from the viewpoint of easy availability, economical efficiency and effect.

Moreover, a mixture of these copolymers or a mixture of these polymers and other resins in a small proportion may also be used as the material of a film, unless the effect of the present invention is impaired.

Furthermore, for the purpose of improving a smoothness, it is permissible to cause the polyester film to contain a small amount of inorganic or organic particles, for example, inorganic fillers, such as titanium oxide, calcium carbonate, silica, barium sulfate and silicone; organic fillers, such as acryls, benzoguanamine, Teflon (registered trademark) and epoxy resin. Adhesive improvers or antistatic agents, such as polyethylene glycol (PEG) and sodium dodecylbenzene sulfonate may be included into the polyester film.

The polyester film to be used for the present invention may be produced by forming a polyester resin like that mentioned above into a film shape by melt extrusion; and then subjecting the resultant to oriented crystallization by longitudinal or transverse biaxial stretching and crystallization by heat treatment. As the method and condition regarding the production of such films, conventional methods and conditions may be selected preferably and used.

The thickness of the support may be selected preferably, and it generally is within a range of from 5 μm to 500 μm.

An easily adhesive layer (not shown in the drawing) may be formed in order to improve the adhesiveness between the electroconductive polymer layer 15 and the support 10. As the easily adhesive layer, a configuration containing a styrene-butadiene copolymer (hereinafter, preferably, referred to as "SBR") or an aqueous urethane resin and a crosslinking agent is preferred. The SBR means a copolymer obtained by mainly copolymerizing styrene and butadiene and other component as required. In the copolymer, it is known that, when a content ratio of styrene and butadiene is controlled, copolymers having various physical properties are obtained.

In the case where an easily adhesive layer is provided in the present invention, a styrene-butadiene copolymer is preferably latex. Specifically, commercially available products which are supplied from Nippon Zeon Co., Ltd. under the trade name of NIPOL, from Sumitomo Naugatuck Co., Ltd. under the trade name of NAUGATEX, from Takeda Chemical Industries, Ltd. under the trade name of CROSLENE, from Asahi-Dow Ltd. under the trade name of ASAHI DOW LATEX, and from Dainippon Ink & Chemicals, Inc. and overseas manufacturers may also be used.

A particle of dispersed particles of the latex is preferably 5 μm or less, more preferably 1 μm or less, and still more preferably 0.2 μm or less. When the particle diameter is in the range, particles are difficult to aggregate in a coating step, and the transparency and glossiness of the film are also excellent. When a thickness of a coating layer is required to be thinner, a particle diameter is preferably made smaller accordingly.

Regarding a styrene-butadiene copolymer contained in the easily adhesive layer, a content ratio of styrene/butadiene is preferably substantially from 50/50 to 80/20. A ratio of SBR contained in the latex is preferably from 30% to 50% by mass by solid content.

In the easily adhesive layer, a crosslinking agent is added in order to improve the physical properties of the SBR. As the crosslinking agent, a triazine-based crosslinking agent is preferred.

A layer containing the above-mentioned diol compound such as ethylene glycol (hereinafter referred to as 'a diol compound layer') (not shown in Fig.) may be provided on or above the support 10 separately from the electroconductive polymer layer 15.

Coating solution for forming the diol compound layer (hereinafter referred to as 'a diol compound layer coating solution') contains at least the above-mentioned diol compound, additionally, a solvent for the application is properly added in accordance with the situation. In addition thereto, an additive may be further added. Examples of an additive further contained include an ultraviolet absorbing agent; inorganic particulates or polymer particulates, for the purpose of improving film strength; a silane coupling agent; a fluorine compound, particularly a fluorine surface-active agent for the purpose of decreasing refractive index to improve transparency.

Examples of solvent for a diol compound layer coating solution include water, alcohol, ether, ketone, ester, hydrocarbon, halogenated hydrocarbon or amide; preferably water or lower alcohol from the viewpoint of costs; and more preferably water in consideration of environment.

The concentration of the diol compound in a diol compound layer coating solution is desirably adjusted properly in consideration of viscosity; generally, preferably from 1% to 100% by mass, and more preferably from 5% to 100% by mass.

In the case of forming the diol compound layer, it is preferable from the viewpoint of electrical conductivity that the diol compound layer is formed on the support to form the electroconductive polymer layer on the diol compound layer, or the electroconductive polymer layer is formed on the support to form the diol compound layer on the electroconductive polymer layer. In addition, in the case of further forming the easily adhesive layer, it is preferable to provide in order of the easily adhesive layer, the diol compound layer and the electroconductive polymer layer; or in order of the easily adhesive layer, the electroconductive polymer layer and the diol compound layer from the support side.

In the case where the diol compound is low in molecular weight, the layer need not be formed by reason of volatilizing.

(2) Electro-Conductive Polymer Layer

The film thickness of the electroconductive polymer layer 15 is not particularly limited, and preferably in a range of from 1 nm to 2 μm, and more preferably in a range of from 10 nm to 1 μm. The film thickness of the electroconductive polymer layer 15 in this range allows sufficient electric conductivity and transparency to be achieved.

An electroconductive polymer layer is formed preferably by coating from the viewpoint that a large area of the electroconductive polymer material may be formed conveniently at one time. Methods other than the coating method include a spin coat method and a transfer method.

A coating solution may be an aqueous dispersion or an organic solvent.

In an electroconductive polymer material of the first exemplary embodiment, coating solution for forming the electroconductive polymer layer 15 (hereinafter referred to as 'an electroconductive polymer layer coating solution') contains at least the above-mentioned electroconductive polymer and trivalent phosphorus compound, additionally a solvent for the application and the above-mentioned dopant are properly added in accordance with the situation. In addition thereto, an additive may be further added. Examples of an additive further contained include an ultraviolet absorbing agent; inorganic particulates or polymer particulates for the purpose of improving film strength; a silane coupling agent; a fluorine compound, particularly a fluorine surface-active agent for the purpose of decreasing refractive index to improve transparency.

As a solvent of the electroconductive polymer layer coating solution, water, alcohols, ethers, ketones, esters, hydrocarbons, halogenated hydrocarbons or amides may be used. Water or lower alcohols are preferred from the viewpoint of the cost, and water is more preferably used from the viewpoint of environment.

In the case where water is used as a solvent, as a method of dispersing the electroconductive polymer, known methods may be used. Examples of the dispersing method include a jaw crusher method, an ultra-centrifugal pulverizing method, a cutting mill method, an automatic pestle method, a disc mill method, a ball mill method and an ultrasonic dispersion method.

A concentration of the electroconductive polymer in the electroconductive polymer layer coating solution is, controlled preferably by considering the viscosity or the like, usually preferably from 0.01% to 50% by mass, and more preferably from 0.1% to 10% by mass.

Coating solution is preferably prepared in such a manner that solution, in which the trivalent phosphorus compound is dissolved, is separately prepared to mix up this solution and dispersion in which the electroconductive polymer is dispersed.

Examples of solvent for dissolving the trivalent phosphorus compound include water, alcohol, ether, ketone, ester, hydrocarbon, halogenated hydrocarbon or amide, specifically methyl ethyl ketone, methanol or water, and preferably methyl ethyl ketone from the viewpoint of solubility and costs.

The concentration of the trivalent phosphorus compound in the solution containing the trivalent phosphorus compound is desirably adjusted properly in consideration of electric conductivity, transparency and durability; generally, preferably 0.00001 to 100% by mass, and more preferably 0.0001 to 50% by mass.

On the occasion of mixing up the dispersion in which the electroconductive polymer is dispersed and the solution in which the trivalent phosphorus compound is dissolved, a uniform state is preferable.

The obtained electroconductive polymer layer coating solution is applied to form an electroconductive polymer layer. Examples of an application method include known application methods such as extrusion die coater, air-doctor coater, blade coater, rod coater, knife coater, squeeze coater, reverse-roll coater and bar coater.

In the case where a layer such as the electroconductive polymer layer 15 is formed on or above the support 10 by two layers or more, each layer may be applied and dried repeatedly, or two layers or more may be formed by simultaneous multilayer coating. Simultaneous multilayer coating is preferable from the viewpoint of decreasing production costs and the shortening production time. Here, 'simultaneous multilayer coating' signifies that two coating solutions are applied in a contact condition.

The above-mentioned simultaneous multilayer coating may be performed by curtain coater, slide coater or extrusion coater, preferably curtain coater among them.

—Second Exemplary Embodiment of Electro-Conductive Polymer Material—

An electroconductive polymer material of the second exemplary embodiment of the present invention is provided a support; at least a layer containing an electroconductive polymer; and a layer containing a trivalent phosphorus compound, the layers being disposed on or above a support.

FIGS. 2A to 2D show an example of a specific layer composition of an electroconductive polymer material of the second exemplary embodiment.

Figure 2A:
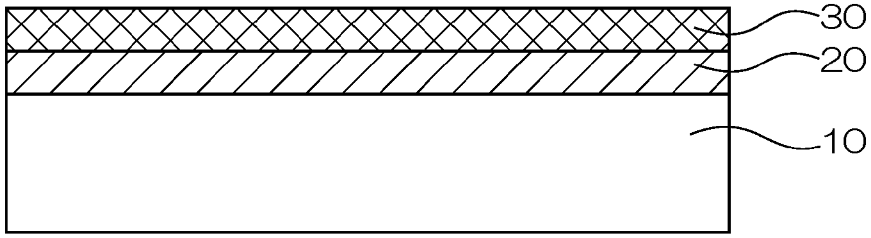
FIGS. 2A, 2B, 2C and 2D are a cross-sectional schematic view showing an example of a layer composition of an electroconductive polymer material of a second exemplary embodiment.

An electroconductive polymer material in FIG. 2A has a support 10, a layer 20 containing an electroconductive polymer, and a layer 30 containing a trivalent phosphorus compound on or above the support 10 in order from the support side.

Figure 2B:
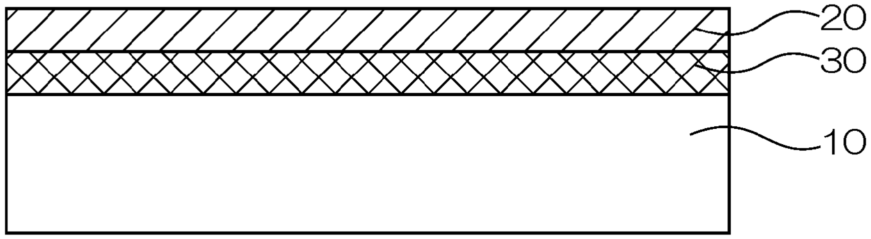

An electroconductive polymer material in FIG. 2B has a support 10, a layer 30 containing a trivalent phosphorus compound, and a layer 20 containing an electroconductive polymer on or above the support 10 in order from the support side.

Figure 2C:
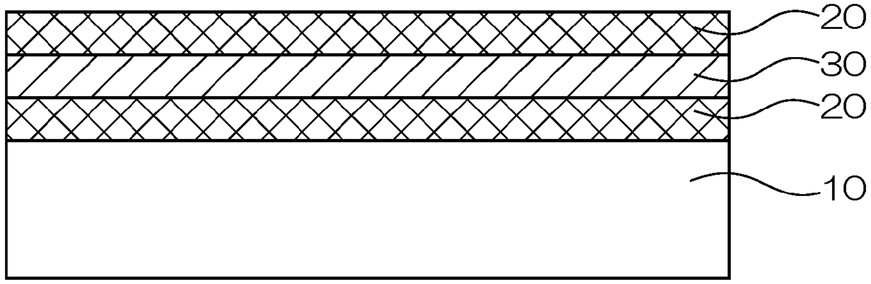

An electroconductive polymer material in FIG. 2C has a support 10, a layer 20 containing an electroconductive polymer, a layer 30 containing a trivalent phosphorus compound, and a layer 20 containing an electroconductive polymer, the three layers being disposed on or above a support 10 in order from the support side.

Figure 2D:
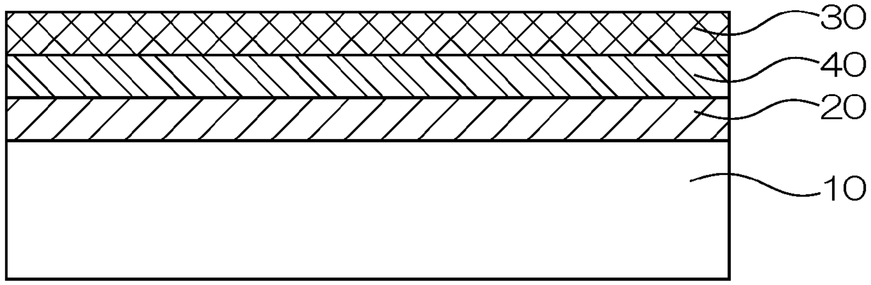

An electroconductive polymer material in FIG. 2D has a support 10, a layer 20 containing an electroconductive polymer, an interlayer 40, and a layer 30 containing a trivalent phosphorus compound, the three layers being disposed on or above a support 10 in order from the support side.

(1) Support

A support in an electroconductive polymer material of the second exemplary embodiment may adopt the same as a support of the first exemplary embodiment.

(2) Layer Containing Electroconductive Polymer

Coating solution for forming the layer 20 containing an electroconductive polymer contains at least the electroconductive polymer and preferably further contains dopant, additionally, a solvent for the application are properly added in accordance with the situation. In addition thereto, an additive may further be added. Examples of an additive further contained include an ultraviolet absorbing agent; inorganic particulates or polymer particulates for the purpose of improving film strength; a silane coupling agent; a fluorine compound, particularly a fluorine surface-active agent for the purpose of decreasing refractive index to improve transparency.

In an electroconductive polymer material of the second exemplary embodiment, the layer 20 containing an electroconductive polymer may contain a trivalent phosphorus compound but yet preferably contains no trivalent phosphorus compounds, and a trivalent phosphorus compound is preferably contained in another layer.

Examples of solvent for the above-mentioned coating solution include water, alcohol, ether, ketone, ester, hydrocarbon, halogenated hydrocarbon and amide, preferably water or lower alcohol from the viewpoint of costs, and more preferably water in consideration of environment.

The concentration of the electroconductive polymer in the above-mentioned coating solution is desirably adjusted properly in consideration of viscosity; generally, preferably within a range of from 0.01% to 50% by mass, and more preferably from 0.1% to 10% by mass.

In an electroconductive polymer material of the second exemplary embodiment, the film thickness of the layer 20 containing an electroconductive polymer is not particularly limited, and preferably in a range of from 1 nm to 2 μm, and more preferably in a range of from 10 nm to 1 μm. The film thickness of the layer containing an electroconductive polymer 20 in this range allows sufficient conductivity and transparency to be achieved.

(3) Layer Containing Trivalent Phosphorus Compound

The layer 30 containing a trivalent phosphorus compound in an electroconductive polymer material of the second exemplary embodiment contains at least the above-mentioned trivalent phosphorus compound. Solvent and an additive described in an electroconductive polymer material of the first exemplary embodiment may also be added to the layer 30 containing a trivalent phosphorus compound. General-purpose polymers (such as polyacrylic ester, polyethylene, polypropylene, polyacrylamide, gelatin and polystyrene) may be added as a binder.

In the case where the trivalent phosphorus compound is added to a different layer from the electroconductive polymer in an electroconductive polymer material of the second exemplary embodiment, the addition does not cause a problem such that the electroconductive polymer is suspended or the like, and does not decrease transparency and conductivity.

With regard to the improvement of photo-durability in the case where the trivalent phosphorus compound is added to a different layer from the electroconductive polymer, the function does not become clear and yet is surmised as follows. However, the present invention is not limited to the surmise.

It is surmised that the trivalent phosphorus compound transfers through the layer and reaches the layer containing an electroconductive polymer to maintain the doped state, or the trivalent phosphorus compound traps oxygen and prevents the electroconductive polymer from being oxidized to consequently improve photo-durability.

In the case where the trivalent phosphorus compound and the electroconductive polymer are added to different layers, the distance between the trivalent phosphorus compound and the electroconductive polymer is farther as compared with the case of being added to the same layer, and the interface exists in each of the layers. It is an unexpected effect that photo-durability is improved despite such a state.

The film thickness of the layer 30 containing the trivalent phosphorus compound is preferably in a range of from 0.01 nm to 1000 μm, more preferably in a range of from 0.1 nm to 100 μm, and still more preferably in a range of from 1 nm to 50 μm. The film thickness of the layer 30 containing the trivalent phosphorus compound in this range preferably allows compatibility between high electric conductivity and high durability.

The added amount of the trivalent phosphorus compound in an electroconductive polymer material of the second exemplary embodiment is preferably from 0.000001 g/m$^2$ to 100 g/m$^2$, more preferably from 0.00001 g/m$^2$ to 10 g/m$^2$, and still more preferably from 0.0001 g/m$^2$ to 2 g/m$^2$ from the viewpoint of compatibility between high electric conductivity and high durability.

In an electroconductive polymer material of the second exemplary embodiment, the adding ratio of the trivalent phosphorus compound and the electroconductive polymer (trivalent phosphorus compound:electroconductive polymer) may be any one, preferably a range of from 0.00001:1 to 1000:1 by mass ratio, preferably a range of from 0.0001:1 to 500:1, and more preferably a range of 0.0005:1 to 100:1 from the viewpoint of compatibility between high conductivity and high durability.

In the case where the electroconductive polymer and the dopant form a composite, the adding ratio of the trivalent phosphorus compound and the above-mentioned composite (composite:trivalent phosphorus compound) may be any one, preferably a range of from 0.0000001 to 1.0:1000 by mass ratio, preferably a range of from 1.0:0.00001 to 1.0:100, more preferably a range of from 1.0:0.0001 to 1.0:50, still more preferably a range of from 1.0:0.001 to 1.0:10, and still more preferably a range of from 1.0:0.005 to 1.0:5.0 from the viewpoint of compatibility between high electric conductivity and high durability.

As shown in FIG. 2D, the layer 30 containing a trivalent phosphorus compound and the layer 20 containing an electroconductive polymer need not be adjacent in an electroconductive polymer material of the second exemplary embodiment, and preferably adjacent.

In order to intend the effect of trapping oxygen by the trivalent phosphorus compound, as shown in FIG. 2A, 2C or 2D, at least one layer 30 containing a trivalent phosphorus compound is preferably provided further away from the support than the layer 20 containing an electroconductive polymer.

Also in an electroconductive polymer material of the second exemplary embodiment, the easily adhesive layer (not shown in Fig.) may be formed for the purpose of improving adhesion properties between the layer 20 containing an electroconductive polymer or the layer 30 containing a trivalent phosphorus compound, and the support 10. The easily adhesive layer may adopt the same as is described in an electroconductive polymer material of the first exemplary embodiment.

An electroconductive polymer material of the second exemplary embodiment is preferably provided with the diol compound layer (not shown in Fig.) described in the first exemplary embodiment from the viewpoint of decreasing electric resistance value. The diol compound layer may adopt the same as is described in an electroconductive polymer material of the first exemplary embodiment.

The ratio of the added electroconductive polymer amount and the added diol compound amount (electroconductive polymer:diol compound) may be any one, preferably a range of from 1:1000 to 1000:1 by mass ratio, preferably a range of from 1:100 to 10:1, and more preferably a range of from 1:10 to 5:1 from the viewpoint of compatibility between costs and conductivity.

The diol compound layer may be formed in any place, such as, between the support 10 and the layer 20 containing an electroconductive polymer, between the support 10 and the layer 30 containing a trivalent phosphorus compound, between the layer 20 containing an electroconductive polymer and the layer 30 containing a trivalent phosphorus compound, and on the outermost surface; and preferably placed as the interlayer 40 shown in FIG. 2D from the viewpoint of compatibility between film quality and conductivity.

An electroconductive polymer material provided on the support 10 with two or three layers is shown in FIGS. 2A to 2D, but optionally provided with four layers or more.

<Utility>

An electroconductive polymer composition of the present invention suppresses the aggregation of an electroconductive polymer, and may form an electroconductive film excellent in photo-durability, transparency and electric conductivity. This electroconductive film may be preferably used as wiring of an electronic material and an electrode (such as a substrate electrode). In particular, the electroconductive film may be formed by coating so as to be easily produced into a large-area electroconductive polymer material and be suitable for application to a substrate electrode.

Such electroconductive film may be preferably used for flexible electroluminescence device (OLED), touch panel, organic TFT, actuator, sensor, electronic paper, flexible dimming material and solar battery.

In particular, the selection of a transparent material such as 3,4-ethylenedioxy-polythiophene for an electroconductive polymer allows an electroconductive polymer material to become transparent. A transparent electroconductive polymer material may be preferably used for an image display device such as a flexible liquid crystal display and a solar battery.

EXAMPLES

The present invention is hereinafter described more specifically by referring to examples. Materials, reagents, amount of substances and ratio, and operations thereof described in the following examples may be properly modified unless deviating from the spirit of the present invention. Accordingly, the scope of the present invention is not limited to the following examples.

Example 1

Water dispersion of poly(3,4-ethylenedioxy)thiophene (PEDOT).polystyrene sulfonic acid (PSS) (trade name: BAYTRON P V4-HC, manufactured by H.C. Stark, a solid content concentration of 1.2% by mass) was applied on a PET film by a bar coater No. 9 and dried. The thickness of the obtained layer was 200 nm.

In addition, 1% by mass-methyl ethyl ketone solution of specific example compound A-4 (a trivalent phosphorus compound) with the same mass as PEDOT was applied by a bar coater No. 9, and dried to obtain sample-1 of the present invention. The thickness of the obtained layer was 200 nm.

The mass ratio of the PEDOT/PSS composite and the specific example compound A-4 was calculated at 1.2:1.0 from the concentration of the coating solution and the thickness of the formed layer, and the applying amount of the specific example compound A-4 was 0.2 g/$m^2$.

The evaluations of the sample-1 were carried out by the following method.

<Measurement of Transmittance>

Transmittance was measured by a UV/vis spectrometer (trade name: U2400, manufactured by Shimadzu Corporation). The measurement was performed at three spots of the sample-1 immediately after being produced to regard the average value as a measured value. The results are shown in Table 1.

<Measurement of Surface Resistance Value>

Surface resistance value was measured by a Loresta resistance measuring apparatus (manufactured by Mitsubishi Chemical Corporation). The measurement was performed at three spots of the sample-1 immediately after being produced to regard the average value as a measured value. The results are shown in Table 1.

<Evaluation of Photo-Durability>

The sample-1 was irradiated with a xenon lamp light source (170000 lux) through a UV cut-off filter (absorbing light of 370 nm by 90%) for 100 hours to measure transmittance and surface resistance value after being irradiated by the above-mentioned method. The results are shown in Table 1.

<Measurement of Haze>

Haze of the sample-1 immediately after being produced was measured by using a haze measuring apparatus (trade name: MODEL1001DP, manufactured by Nippon Denshoku Industries Co., Ltd.). The results are shown in Table 1.

Examples 2 to 9

Samples-2 to 9 were produced in the same manner as Example 1 except for adding compounds shown in Table 1 instead of the specific example compound A-4. The compounds shown in Table 1 were added so as to have the same mass as the compound A-4 added in Example 1. The evaluations of the obtained samples-2 to 9 were performed in the same manner as Example 1. The results of evaluation are shown in Table 1.

Example 10

Sample-10 was produced in the same manner as Example 1 except for replacing a PET substrate with a glass substrate.

The evaluations of the obtained sample-10 were performed in the same manner as Example 1. The results of evaluation are shown in Table 1.

Comparative Example 1

Comparative sample-1 was produced in the same manner as Example 1 except for not adding the specific example compound A-4. The evaluations of the obtained comparative sample-1 were performed in the same manner as Example 1. The results of evaluation are shown in Table 1.

Comparative Example 2

The coating solution was prepared in the same manner as Example 1 except for replacing the specific example compound A-4 in Example 1 with 10% by mass-aqueous solution of polyphosphoric acid (manufactured by Tokyo Chemical Industry Co., Ltd.).

This coating solution was produced into comparative sample-2 by the same method as Example 1. The evaluations of this comparative sample-2 were performed in the same manner as Example 1. The results of evaluation are shown in Table 1.

TABLE 1

| | | Before being irradiated with light | | After being irradiated with light | | | |
|---|---|---|---|---|---|---|---|
| Sample No. | Additive | Surface Resistance (Ω/□) | Transmittance (%) | Surface Resistance (Ω/□) | Transmittance (%) | Haze before being irradiated with light | Notes |
| Example 1 | A-4 | 10,400 | 83 | 17,400 | 82 | 2.0% or less | |
| Example 2 | A-13 | 9,600 | 83 | 17,200 | 82 | 2.0% or less | |
| Example 3 | A-17 | 11,500 | 83 | 23,000 | 82 | 2.0% or less | |
| Example 4 | A-36 | 11,000 | 83 | 22,000 | 82 | 2.0% or less | |
| Example 5 | B-6 | 12,500 | 83 | 25,500 | 82 | 2.0% or less | |
| Example 6 | B-16 | 11,500 | 83 | 28,000 | 82 | 2.0% or less | |
| Example 7 | B-37 | 10,500 | 83 | 22,500 | 82 | 2.0% or less | |
| Example 8 | C-2 | 11,500 | 83 | 27,000 | 82 | 2.0% or less | |
| Example 9 | D-2 | 12,000 | 83 | 30,000 | 82 | 2.0% or less | |
| Example 10 | A-4 | 10,400 | 83 | 17,400 | 82 | 2.0% or less | glass substrate |
| Comparative Example 1 | none | 11,500 | 83 | 48,000 | 82 | 2.0% or less | |
| Comparative Example 2 | polyphosphoric acid | 152,000 | 70 | 550,000 | 62 | 13% | |

As is clear from the results in Table 1, it is found that the electroconductive polymer materials of Examples 1 to 10 are excellent in transparency and electric conductivity due to low surface resistance and little haze in the samples before being irradiated with light.

In Examples 1 to 10, transmittance after being irradiated with light had approximately the same value as that before being irradiated with light, although slightly decreased. In addition, in Examples 1 to 10, surface resistance after being irradiated with light was increased compared to before being irradiated with light, but the coefficient of fluctuation thereof was sufficiently smaller than the samples of the Comparative Examples, and Examples 1 to 10 were sufficiently tolerable for practical use. The haze was at approximately the same level between before and after light irradiation.

Thus, it is found that the electroconductive polymer materials of Examples 1 to 10 are excellent in photo-durability since there were few changes in transmittance and surface resistance after being irradiated with light.

On the other hand, in the sample of Comparative Example 1, surface resistance was remarkably increased by light irradiation. Therefore, it is found that Examples 1 to 10 are excellent also in view of photo-durability. In Comparative Example 2, the aggregation of the polymer was caused at the stage of producing the coating solution, and unevenness was caused in the sample produced by using this coating solution. As a result, the sample of Comparative Example 2 before being irradiated with light had significantly lower transmittance, remarkably higher surface resistance and increased haze compared to Examples 1 to 10.

Example 11

Water dispersion of poly(3,4-ethylenedioxy)thiophene (PEDOT).polystyrene sulfonic acid (PSS) (trade name: BAYTRON P V4-HC, manufactured by H.C. Stark, a solid content concentration of 1.2% by mass) was applied on a PET film by a bar coater No. 9 and dried. The thickness of the obtained layer was 200 nm.

Next, 10% by mass-aqueous solution of ethylene glycol was applied by a bar coater No. 9 thereon and dried.

Furthermore, 1% by mass-methyl ethyl ketone solution of specific example compound A-4 (a trivalent phosphorus compound) with the same mass as PEDOT was applied by a bar coater No. 9, and dried to obtain sample-11 of the present invention. The thickness of the obtained layer was 200 nm.

The mass ratio of the PEDOT/PSS composite and the specific example compound A-4 was calculated at 1.2:1.0 from the concentration of the coating solution and the thickness of the formed layer, and the applying amount of the specific example compound A-4 was 0.2 $g/m^2$.

The same evaluations as Example 1 were performed for the sample-11. The results are shown in Table 2.

Examples 12 to 19

Samples-12 to 19 were produced in the same manner as Example 11 except for adding compounds shown in Table 2 instead of the specific example compound A-4. The compounds shown in Table 2 were added so as to have the same mass as the compound A-4 added in Example 11. The evaluations of the obtained samples-12 to 19 were performed in the same manner as Example 1. The results of evaluation are shown in Table 2.

Example 20

Sample-20 was produced in the same manner as Example 11 except for replacing a PET substrate with a glass substrate.

The evaluations of the obtained sample-20 were performed in the same manner as Example 1. The results of evaluation are shown in Table 2.

Comparative Example 3

Comparative sample-3 was produced in the same manner as Example 11 except for not adding the specific example compound A-4. The evaluations of the obtained comparative sample-3 were performed in the same manner as Example 1. The results of evaluation are shown in Table 2.

Comparative Example 4

The coating solution was prepared in the same manner as Example 11 except for replacing the specific example compound A-4 in Example 11 with 10% by mass-aqueous solution of polyphosphoric acid (manufactured by Tokyo Chemical Industry Co., Ltd.).

This coating solution was produced into comparative sample-4 by the same method as Example 11. The evaluations of this comparative sample-4 were performed in the same manner as Example 1. The results of evaluation are shown in Table 2.

TABLE 2

| Sample No. | Additive | Before being irradiated with light: Surface resistance (Ω/□) | Before being irradiated with light: Transmittance (%) | After being irradiated with light: Surface resistance (Ω/□) | After being irradiated with light: Transmittance (%) | Haze before being irradiated with light | Notes |
|---|---|---|---|---|---|---|---|
| Example 11 | A-4 | 720 | 83 | 800 | 82 | 2.0% or less | |
| Example 12 | A-13 | 730 | 83 | 800 | 82 | 2.0% or less | |
| Example 13 | A-17 | 760 | 83 | 830 | 82 | 2.0% or less | |
| Example 14 | A-36 | 780 | 83 | 840 | 82 | 2.0% or less | |
| Example 15 | B-6 | 780 | 83 | 880 | 82 | 2.0% or less | |
| Example 16 | B-16 | 780 | 83 | 880 | 82 | 2.0% or less | |
| Example 17 | B-37 | 750 | 83 | 810 | 82 | 2.0% or less | |
| Example 18 | C-2 | 780 | 83 | 900 | 82 | 2.0% or less | |
| Example 19 | D-2 | 800 | 83 | 940 | 82 | 2.0% or less | |
| Example 20 | A-4 | 720 | 83 | 800 | 82 | 2.0% or less | glass substrate |
| Comparative Example 3 | none | 800 | 83 | 2,600 | 82 | 2.0% or less | |
| Comparative Example 4 | phosphoric acid | 780 | 83 | 2,500 | 82 | 2.0% or less | |

As is clear from the results in Table 2, performing an ethylene glycol treatment decreased surface resistance. It is found that the electroconductive polymer materials of Examples 11 to 20 are excellent in transparency and electric conductivity due to high transmittance, low surface resistance and little haze in the samples before being irradiated with light. In Examples 11 to 20, transmittance after being irradiated with light had approximately the same value as that before being irradiated with light, although slightly decreased.

In addition, in Examples 11 to 20, surface resistance after being irradiated with light was slightly increased compared to before being irradiated with light, but surface resistances between before and after light irradiation were substantially the same as compared with the samples of Comparative Examples. Examples 11 to 20 were sufficiently tolerable for practical use. The haze was at approximately the same level between before and after light irradiation.

Thus, it is found that the electroconductive polymer materials of Examples 11 to 20 are excellent in photo-durability since there were few changes in transmittance and surface resistance after being irradiated with light.

Example 21

Sample-21 was produced in the same manner as Example 1 except for replacing BAYTRON P V4-HC (trade name, manufactured by H.C. Stark, a solid content concentration of 1.2% by mass) used in Example 1 with 3.0% by mass-dispersion containing polyaniline (manufactured by Aldrich) in xylene. The sample-21 was not coated with ethylene glycol similarly to the sample-1.

The evaluations of the obtained sample-21 were performed in the same manner as Example 1. The results are shown in Table 3.

Comparative Example 5

Comparative sample-5 was produced in the same manner as Example 21 without placing a layer containing A-4. The evaluations of the obtained comparative sample-5 were performed in the same manner as Example 1. The results are shown in Table 3.

TABLE 3

| Sample No. | Additive | Polymer | Before being irradiated with light: Surface resistance (Ω/□) | Before being irradiated with light: transmittance (%) | After being irradiated with light: Surface Resistance (Ω/□) | After being irradiated with light: Transmittance (%) | Haze |
|---|---|---|---|---|---|---|---|
| Example 21 | A-4 | polyaniline | 600 | 75 | 920 | 74 | 4% |
| Comparative Example 5 | none | polyaniline | 700 | 75 | 4100 | 70 | 6% |

As shown in Table 3, Example 21 exhibited high transmittance and low surface resistance, and was also excellent in photo-durability as compared with Comparative Example 5 containing no trivalent phosphorus compounds.

Examples 22 to 24

Samples-22 to 24 were produced in the same manner as Example 1 except for modifying the adding ratio (mass ratio) of the PEDOT/PSS composite and the specific example compound A-4 in Example 1 so as to be shown in the following Table 4.

The evaluations of the obtained samples-22 to 24 were performed in the same manner as Example 1. The results are shown in Table 4.

TABLE 4

| | | | Before being irradiated with light | | After being irradiated with light | | |
|---|---|---|---|---|---|---|---|
| Sample No. | Additive | Adding ratio (mass ratio) Additive:PEDOT/PSS | Surface resistance (Ω/□) | Transmittance (%) | Surface resistance (Ω/□) | Transmittance (%) | Haze |
| Example 22 | A-4 | 0.02:1.2 | 11,500 | 83 | 24,200 | 82 | 2.0% or less |
| Example 23 | A-4 | 0.05:1.2 | 10,800 | 83 | 18,500 | 82 | 2.0% or less |
| Example 24 | A-4 | 0.1:1.2 | 10,300 | 83 | 18,000 | 82 | 2.0% or less |
| Example 1 | A-4 | 1:1.2 | 10,400 | 83 | 17,400 | 82 | 2.0% or less |

As shown in Table 4, Examples 22 to 24 exhibited high transmittance and low surface resistance, and was excellent in photo-durability even though the adding ratio of the electroconductive polymer and the trivalent phosphorus compound was modified. In particular, an adding ratio (addition agent: PEDOT/PSS) of from 0.05:1.2 to 1:1.2 offered an excellent effect in photo-durability.

Example 25

1% by mass-methyl ethyl ketone solution of specific example compound A-4 (a trivalent phosphorus compound) with the same mass as PEDOT was added to water dispersion of poly(3,4-ethylenedioxy)thiophene (PEDOT).polystyrene sulfonic acid (PSS) (trade name: BAYTRON P V4-HC, manufactured by H.C. Stark, a solid content concentration of 1.2% by mass), and the mixed solution was applied on a PET film by a bar coater No. 9 and dried to obtain sample-25 of the present invention. The thickness of the obtained layer was 200 nm.

When the evaluations of the sample-25 were performed in the same manner as Example 1, the effect of improving photo-durability was confirmed similarly to Example 1.

Example 26

Production of Touch Panel Device

A glass substrate on which indium-tin oxide was placed by vapor deposition was prepared to form a dot spacer with a thickness of 4 μm (trade name: RESIST CR-103C, manufactured by Toyobo Co., Ltd.) by photolithography, and thereafter form wiring by screen printing of silver paste (trade name: DW-250H-5, manufactured by Toyobo Co., Ltd.). In addition, an insulating region was formed by insulating ink (trade name: JELCON IN, manufactured by JUJO CHEMICAL CO., LTD.). Lastly, the sample-1 produced in Example 1 was stuck thereto to produce a touch panel device.

(Evaluation of Touch Panel Device)

When the above-mentioned touch panel device was operated under the condition that outdoor light was incident thereon, favorable touch panel characteristics were exhibited. That is, it was confirmed that the touch panel device provided the electroconductive polymer material of the present invention was high in photo-durability.

The foregoing description of the embodiments of the present invention has been provided for the purposes of illustration and description. It is not intended to be exhaustive or to limit the present invention to the precise forms disclosed. Obviously, many modifications and variations will be apparent to practitioners skilled in the art. The embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An electroconductive polymer composition comprising an electroconductive polymer having an electroconductivity of $10^{-6}$ $S \cdot cm^{-1}$ or more and a trivalent phosphorus compound, wherein the trivalent phosphorus compound is a compound represented by the following formulae (I), (II), (III) or (IV):

Formula (I)

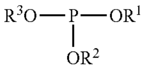

Formula (II)

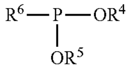

Formula (III)

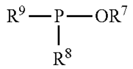

Formula (IV)

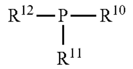

wherein $R^1$, $R^2$, $R^3$, $R^4$, $R^5$, $R^6$, $R^7$, $R^8$, $R^9$, $R^{10}$, $R^{11}$ and $R^{12}$ in Formulae (I), (II), (III) and (IV) each independently represent a hydrogen atom, an alkyl group having 1 to 40 carbon atoms, an aryl group having 6 to 40 carbon atoms, or a five-membered to eight-membered heteroaryl group including at least one hetero atom of N, S, O or Se, wherein the electroconductive polymer includes polythiophene or a derivative thereof represented by the following Formula (1):

Formula (1)

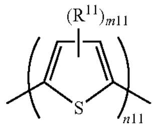

wherein, in Formula (1), $R^{11}$ represents a substituent; m11 is an integer of from 0 to 2; when m11 represents 2, the $R^{11}$s may be either the same or different and also may be linked to each other to form a ring; and $n^{11}$ is an integer of 1 or greater, and wherein a compounding ratio of the trivalent phosphorus compound and the electroconductive polymer (trivalent phosphorus compound:electroconductive polymer) is in a range of from 0.05:1.2 to 1:1.2 by mass ratio.

2. The electroconductive polymer composition according to claim 1, wherein the trivalent phosphorus compound is a compound represented by Formula (I).

3. The electroconductive polymer composition according to claim 1, wherein the trivalent phosphorus compound is a compound represented by Formula (I), and $R^1$, $R^2$ and $R^3$ in Formula (I) are an alkyl group.

4. The electroconductive polymer composition according to claim 1, wherein the electroconductive polymer includes poly(3,4-ethylenedioxy)thiophene.

5. The electroconductive polymer composition according to claim 1, further comprising polystyrene sulfonic acid as dopant.

6. The electroconductive polymer composition according to claim 1, further comprising water to be in a state of dispersion.

7. An electroconductive polymer material comprising:

a support; and a layer formed by using the electroconductive polymer composition according to claim 1 on or above the support.

8. An electroconductive polymer material comprising:

a support;

at least one layer containing a electroconductive polymer having electroconductivity of $10^{-6}$ S·cm$^{-1}$ or more; and at least one layer containing a trivalent phosphorus compound, and the layers being disposed on or above the support, wherein the trivalent phosphorus compound is a compound represented by the following Formulae (I), (II), (III) or (IV):

Formula (I)

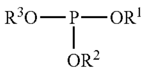

Formula (II)

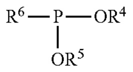

Formula (III)

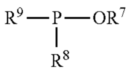

Formula (IV)

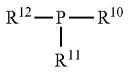

wherein $R^1$, $R^2$, $R^3$, $R^4$, $R^5$, $R^6$, $R^7$, $R^8$, $R^9$, $R^{10}$, $R^{11}$ and $R^{12}$ in Formulae (I), (II), (III) and (IV) each independently represent a hydrogen atom, an alkyl group having 1 to 40 carbon atoms, an aryl group having 6 to 40 carbon atoms, or a five-membered to eight-membered heteroaryl group including at least one hetero atom of N, S, O or Se, wherein the electroconductive polymer includes polythiophene or a derivative thereof represented by the following Formula (1):

Formula (1)

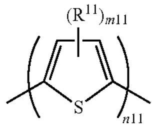

wherein, in Formula (1), $R^{11}$ represents a substituent; m11 is an integer of from 0 to 2; when m11 represents 2, the $R^{11}$s may be either the same or different and also may be linked to each other to form a ring; and $n^{11}$ is an integer of 1 or greater, and wherein a compounding ratio of the trivalent phosphorus compound and the electroconductive polymer (trivalent phosphorus compound:electroconductive polymer) is in a range of from 0.05:1.2 to 1:1.2 by mass ratio.

9. The electroconductive polymer material according to claim 8, wherein the trivalent phosphorus compound is a compound represented by Formula (I).

10. The electroconductive polymer material according to claim 8, wherein the at least one layer containing the trivalent phosphorus compound is provided further away from the support than the at least one layer containing the electroconductive polymer.

11. The electroconductive polymer material according to claim 8, wherein a film thickness of the at least one layer containing the trivalent phosphorus compound is in the range of from 1 nm to 50 μm.

12. The electroconductive polymer material according to claim 8, further comprising a diol compound.

13. The electroconductive polymer material according to claim 8, wherein the at least one layer containing the electroconductive polymer is surface-treated with a diol compound, and the at least one layer containing the trivalent phosphorus compound is disposed on or above the at least one layer containing the electroconductive polymer which is surface-treated with the diol compound.

14. A method of producing the electroconductive polymer material according to claim 8, the method comprising forming at least two layers among the at least one layer containing the electroconductive polymer and the at least one layer containing the trivalent phosphorus compound by simultaneous multilayer coating.

* * * * *